(12) United States Patent
Hu

(10) Patent No.: US 12,107,908 B2
(45) Date of Patent: Oct. 1, 2024

(54) MEDIA FILE ENCAPSULATING METHOD, MEDIA FILE DECAPSULATING METHOD, AND RELATED DEVICES

(71) Applicant: Tencent Technology (Shenzhen) Company Limited, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/954,134

(22) Filed: Sep. 27, 2022

(65) Prior Publication Data
US 2023/0034937 A1    Feb. 2, 2023

Related U.S. Application Data

(63) Continuation of application No. PCT/CN2021/118755, filed on Sep. 16, 2021.

(30) Foreign Application Priority Data

Oct. 14, 2020   (CN) .......................... 202011098190.7

(51) Int. Cl.
  *H04L 65/60*    (2022.01)
  *H04N 19/597*    (2014.01)
(52) U.S. Cl.
  CPC .......... *H04L 65/60* (2013.01); *H04N 19/597* (2014.11); *H04L 2212/00* (2013.01)
(58) Field of Classification Search
  CPC .... H04L 65/60; H04L 2212/00; H04N 19/597
  See application file for complete search history.

(56) References Cited

U.S. PATENT DOCUMENTS

2012/0212579 A1   8/2012   Fröjdh et al.
2015/0269736 A1   9/2015   Hannuksela et al.
(Continued)

FOREIGN PATENT DOCUMENTS

CN    108616751 A    10/2018
CN    108833937 A    11/2018
(Continued)

OTHER PUBLICATIONS

M. Hannuksela, "For the Interlayer Prediction for Scalable Video Encoding and Decoding", Dec. 1, 2017, CN 107431819 A (English Translation), pp. 1-178 (Year: 2017).*

(Continued)

*Primary Examiner* — Jonathan A Bui
(74) *Attorney, Agent, or Firm* — Morgan, Lewis & Bockius LLP

(57) ABSTRACT

This application provides a media file encapsulating method, a media file decapsulating method, and related devices. The media file encapsulating method includes: acquiring a media stream of a target media content in a corresponding application scenario; encapsulating the media stream to generate an encapsulation file of the media stream, the encapsulation file including a first application scenario type field, the first application scenario type field being used for indicating the application scenario corresponding to the media stream; and transmitting the encapsulation file to a first device for the first device to determine the application scenario corresponding to the media stream according to the first application scenario type field and determine at least one of a decoding method and a rendering method of the media stream according to the application scenario corresponding to the media stream. This method can distinguish different application scenarios in the encapsulation of media files.

14 Claims, 12 Drawing Sheets

(56) References Cited

U.S. PATENT DOCUMENTS

| | | | |
|---|---|---|---|
| 2019/0114830 A1* | 4/2019 | Bouazizi | G06F 3/013 |
| 2019/0325652 A1 | 10/2019 | Di et al. | |
| 2019/0379884 A1 | 12/2019 | Oh et al. | |
| 2021/0084096 A1* | 3/2021 | Song | H04N 21/816 |
| 2021/0218947 A1* | 7/2021 | Oh | H04N 13/178 |
| 2021/0358175 A1 | 11/2021 | Iguchi et al. | |
| 2021/0407142 A1* | 12/2021 | Hur | G06T 9/40 |
| 2022/0159261 A1* | 5/2022 | Oh | H04N 21/6379 |

FOREIGN PATENT DOCUMENTS

| | | |
|---|---|---|
| CN | 110651482 A | 1/2020 |
| CN | 110704673 A | 1/2020 |
| CN | 110706355 A | 1/2020 |
| CN | 110944222 A | 3/2020 |
| CN | 111435991 A | 7/2020 |
| EP | 3905532 A1 | 12/2019 |
| JP | 2018137817 A | 8/2018 |
| JP | 2021528891 A | 10/2021 |
| KR | 20190101422 A | 8/2019 |
| WO | WO 2020002122 A1 | 1/2020 |
| WO | 2020032004 A1 | 2/2020 |
| WO | WO 2020137642 A1 | 7/2020 |
| WO | WO 2020166612 A1 | 8/2020 |

OTHER PUBLICATIONS

Liang Wang, et al., "A Telepresence Endpoint Capability Interaction Method and Device", May 31, 2019, CN 104219484 B (English Translation), pp. 1-68 (Year: 2019).*

Tencent Technology, WO, PCT/CN2021/118755, Nov. 26, 2021, 4 pgs.

Tencent Technology, IPRP, PCT/CN2021/118755, Apr. 13, 2023, 5 pgs.

Tencent Technology, ISR, PCT/CN2021/118755, Nov. 26, 2021, 2 pgs.

Tencent Technology, Korean Office Action, KR Patent Application No. 10-2022-7037594, Aug. 16, 2023, 9 pgs.

Emre B. Aksu, "Technologies Under Consideration for Carriage of Point Cloud Data", Document: N18607, International Organization for Standardization, ISO/IEC JTC 1/SC 29/WG 11, Coding of Moving Pictures and Audio, Gothenburg, SE, Jul. 2019, 66 pgs.

Tencent Technology, Extended European Search Report, EP Patent Application No. 21879194.5, Feb. 8, 2024, 10 pgs.

\* cited by examiner

| View 1 texture map | View 2 texture map |
|---|---|
| View 3 texture map | View 4 texture map |
| View 1 depth map | View 2 depth map |
| View 3 depth map | View 4 depth map |

FIG. 7

| View 1 texture map | View 2 texture map | View 1 depth map | View 2 depth map |
|---|---|---|---|
| View 3 texture map | View 4 texture map | View 3 depth map | View 4 depth map |

FIG. 8

MEDIA FILE ENCAPSULATING METHOD, MEDIA FILE DECAPSULATING METHOD, AND RELATED DEVICES

CROSS-REFERENCE TO RELATED APPLICATIONS

This application is a continuation application of PCT Patent Application No. PCT/CN2021/118755, entitled "MEDIA FILE ENCAPSULATION METHOD, MEDIA FILE DECAPSULATION METHOD, AND RELATED DEVICE" filed on Sep. 16, 2021, which claims priority to Chinese Patent Application No. 202011098190.7, filed with the State Intellectual Property Office of the People's Republic of China on Oct. 14, 2020, and entitled "MEDIA FILE ENCAPSULATING METHOD, MEDIA FILE DECAPSULATING METHOD, AND RELATED DEVICES", all of which are incorporated herein by reference in their entirety.

FIELD OF THE TECHNOLOGY

This application relates to the field of data processing technologies, and specifically, to encapsulation and decapsulation technologies of media files.

BACKGROUND OF THE DISCLOSURE

Immersive media refers to media content that can bring users an immersive experience, which may also be referred to as immersion media. In a broad sense, media content that allows users to feel immersive through audio and video technology is immersive media. For example, a user wearing a virtual reality (VR) headset feels a strong sense of immersion in the scene.

Immersive media is applicable in a variety of forms. When decapsulating, decoding, and rendering immersive media in different application scenarios, different operation steps and processing capabilities are required on a user side. However, in the related art, application scenarios corresponding to immersive media cannot be effectively distinguished, which increases the difficulty of processing immersive media on the user side.

SUMMARY

Embodiments of this application provide a media file encapsulating method, a media file decapsulating method, a media file encapsulating apparatus, a media file decapsulating apparatus, an electronic device, and a non-transitory computer-readable storage medium, which can distinguish different application scenarios in the encapsulation of media files.

An embodiment of this application provides a media file encapsulating method, performed by an electronic device, the method including: acquiring a media stream of a target media content in a corresponding application scenario; encapsulating the media stream to generate an encapsulation file of the media stream, the encapsulation file including a first application scenario type field, the first application scenario type field being used for indicating the application scenario corresponding to the media stream; and transmitting the encapsulation file to a first device for the first device to determine the application scenario corresponding to the media stream according to the first application scenario type field and determine at least one of a decoding method and a rendering method of the media stream according to the application scenario corresponding to the media stream.

An embodiment of this application provides a media file decapsulating method, performed by an electronic device, the method including: receiving an encapsulation file of a media stream of a target media content in a corresponding application scenario, the encapsulation file including a first application scenario type field, the first application scenario type field being used for indicating the application scenario corresponding to the media stream; decapsulating the encapsulation file to obtain the first application scenario type field; determining the application scenario corresponding to the media stream according to the first application scenario type field; and determining at least one of a decoding method and a rendering method of the media stream according to the application scenario corresponding to the media stream.

An embodiment of this application provides a media file encapsulating apparatus, including: a media stream acquiring unit, configured to acquire a media stream of a target media content in a corresponding application scenario; a media stream encapsulating unit, configured to encapsulate the media stream to generate an encapsulation file of the media stream, the encapsulation file including a first application scenario type field, the first application scenario type field being used for indicating the application scenario corresponding to the media stream; and an encapsulation file transmitting unit, configured to transmit the encapsulation file to a first device for the first device to determine the application scenario corresponding to the media stream according to the first application scenario type field and determine at least one of a decoding method and a rendering method of the media stream according to the application scenario corresponding to the media stream.

An embodiment of this application provides a media file decapsulating apparatus, including: an encapsulation file receiving unit, configured to receive an encapsulation file of a media stream of a target media content in a corresponding application scenario, the encapsulation file including a first application scenario type field, the first application scenario type field being used for indicating the application scenario corresponding to the media stream; a file decapsulating unit, configured to decapsulate the encapsulation file to obtain the first application scenario type field; an application scenario obtaining unit, configured to determine the application scenario corresponding to the media stream according to the first application scenario type field; and a decoding and rendering determining unit, configured to determine at least one of a decoding method and a rendering method of the media stream according to the application scenario corresponding to the media stream.

An embodiment of this application provides a non-transitory computer-readable storage medium, storing a computer program, the program, when executed by a processor of an electronic device, causing the electronic device to implement the media file encapsulating method or the media file decapsulating method in the foregoing embodiments.

An embodiment of this application provides an electronic device, including: at least one processor; and a storage apparatus, configured to store at least one program, the at least one program, when executed by the at least one processor, causing the electronic device to implement the media file encapsulating method or the media file decapsulating method in the foregoing embodiments.

An embodiment of this application provides a computer program product including an instruction, the instruction, when run on a computer, causing the computer to perform the media file encapsulating method or the media file decapsulating method in the foregoing embodiments.

In the technical solutions provided in some embodiments of this application, when an encapsulation file of a media stream in a corresponding application scenario is generated, a first application scenario type field is extended in the encapsulation file, and the first application scenario type field is used for indicating the application scenario corresponding to the media stream. Therefore, application scenarios corresponding to different media streams can be distinguished in the encapsulation of media files. On the one hand, when the encapsulation file is transmitted to a first device, the first device may distinguish the application scenario of the media stream according to the first application scenario type field in the encapsulation file, and consequently may determine which decoding method or rendering method to adopt for the media stream according to the application scenario corresponding to the media stream, which can save the computing power and resources of the first device. On the other hand, the application scenario of the media stream can be determined in the encapsulation stage, so even if the first device does not have the decoding capability for the media stream, the application scenario corresponding to the media stream can be determined without waiting until the media stream is decoded.

BRIEF DESCRIPTION OF THE DRAWINGS

FIG. 7 is a schematic diagram of an up-down stitching mode of 6DoF media according to an embodiment of this application.

FIG. 8 is a schematic diagram of a left-right stitching mode of 6DoF media according to an embodiment of this application.

DESCRIPTION OF EMBODIMENTS

Figure 1:
FIG. 1 is a schematic diagram of 3DoF.

Now, exemplary implementations are described comprehensively with reference to the accompanying drawings. However, the exemplary implementations may be implemented in various forms, and may not be understood as being limited to the examples described herein. Conversely, the implementations are provided to make this application more comprehensive and complete, and comprehensively convey the idea of the exemplary implementations to a person skilled in the art.

In addition, the described features, structures, or characteristics may be combined in one or more embodiments in any appropriate manner. In the following descriptions, a lot of specific details are provided to give a full understanding of the embodiments of this application. However, a person skilled in the art is to be aware of that, the technical solutions in this application may be implemented without one or more of the specific details, or may be implemented by using other methods, components, apparatuses, or steps. In other cases, well-known methods, apparatuses, implementations, or operations are not shown or described in detail, to avoid obscuring the aspects of this application.

The block diagrams shown in the accompanying drawings are merely functional entities and do not necessarily correspond to physically independent entities. To be specific, such functional entities may be implemented in the form of software, or implemented in at least one hardware module or integrated circuit, or implemented in different networks and/or processor apparatuses and/or microcontroller apparatuses.

The flowcharts shown in the accompanying drawings are merely examples for descriptions, do not necessarily include all content and operations/steps, and are not necessarily performed in the described order. For example, some operations/steps may be further divided, while some operations/steps may be combined or partially combined. Therefore, an actual execution order may vary depending on an actual situation.

First, terms involved in the embodiments of this application are described as follows.

Point cloud: A point cloud is a set of discrete points that are randomly distributed in space and express the spatial structure and surface attributes of a 3-dimension (3D) object or scene. A point cloud is a set of massive 3D points. Each point in the point cloud has at least 3D position information, and may also have color, material, or other information (additional attributes such as reflectivity) depending on the application scenario. Generally, each point in the point cloud has the same quantity of additional attributes. For example, the point cloud, obtained according to a laser measurement principle, includes 3D coordinates (XYZ) and a laser reflectance; the point cloud, obtained according to a photogrammetry principle, includes 3D coordinates (XYZ) and color information (RGB); and the point cloud, obtained according to both the laser measurement principle and the photogrammetry principle, includes 3D coordinates (XYZ), a laser reflectance, and color information (RGB).

According to use, the point cloud may be divided into two categories: a machine cognition point cloud and a human eye cognition point cloud. For example, the machine cognition point cloud is applicable to autonomous navigation systems, real-time inspection systems, geographic information systems, visual sorting robots, emergency rescue and disaster relief robots, and the like. For example, the human eye cognition point cloud is applicable to digital cultural heritage, free viewpoint broadcasting, 3D immersive communication, 3D immersive interaction, and the like.

According to the way of acquisition, the point cloud may be divided into three categories: a static point cloud, a dynamic point cloud, and a dynamically acquired point cloud. Static point cloud: The object is stationary, and the device for acquiring the point cloud is also stationary. Dynamic point cloud: The object is moving, but the device for acquiring the point cloud is stationary. Dynamically acquired point cloud: The device for acquiring the point cloud is moving.

Point cloud compression (PCC): A point cloud is a set of massive points. These point cloud data not only consumes a lot of storage memory, but also is not conducive to transmission. In the related art, there is not such a large bandwidth to support the direct transmission of the point cloud at a network layer without compression, so it is necessary to compress the point cloud.

Geometry-based point cloud compression (G-PCC): G-PCC can be used to compress the static point cloud and the dynamically acquired point cloud, and the correspondingly obtained point cloud media may be referred to as point cloud media compressed based on geometric features, G-PCC point cloud media for short.

Video-based point cloud compression (V-PCC): V-PCC can be used to compress the dynamic point cloud, and the correspondingly obtained point cloud media may be referred to as point cloud media compressed based on conventional video encoding, V-PCC point cloud media for short.

Sample: an encapsulation unit in a media file encapsulating process. A media file includes a plurality of samples. For example, if a media file is video media, a sample of the video media is usually a video frame.

Degree of Freedom (DoF): In the mechanical system, it refers to the number of independent coordinates. In addition to the translational DoF, there are also rotational DoF and vibrational DoF. In the embodiments of this application, DoF refers to the degree of freedom of motion and content interaction supported by immersive media watched by a user.

3DoF: three degrees of freedom for the rotation of the head of a user around the XYZ axes. FIG. 1 is a schematic diagram of 3DoF. As shown in FIG. 1, a certain point in a certain place can rotate on all three axes, so the user can turn his/her head, put his/her head up and down, or swing his/her head left and right. Through the 3DoF experience, the user can immerse himself/herself in a scene in 360 degrees. If the scene is static, it can be understood as a panoramic picture. If the panoramic picture is dynamic, it is a panoramic video, that is, a VR video. However, a 3DoF VR video has certain limitations, that is, the user cannot move, and cannot choose any place to watch.

Figure 2:
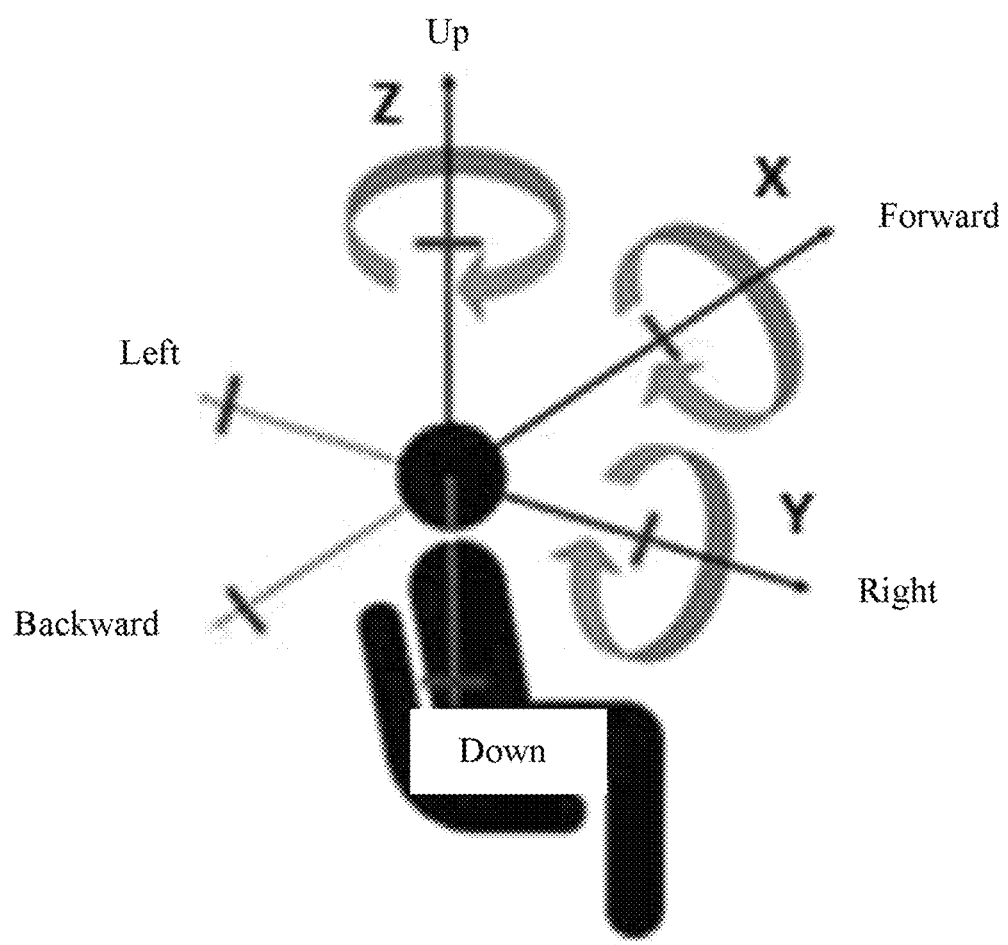
FIG. 2 is a schematic diagram of 3DoF+.

3DoF+: Based on 3DoF, the user also has DoF of constrained movement along the XYZ axes, also referred to as constrained 6DoF, and the corresponding media stream may be referred to as 3DoF+ media stream. FIG. 2 is a schematic diagram of 3DoF+.

Figure 3:
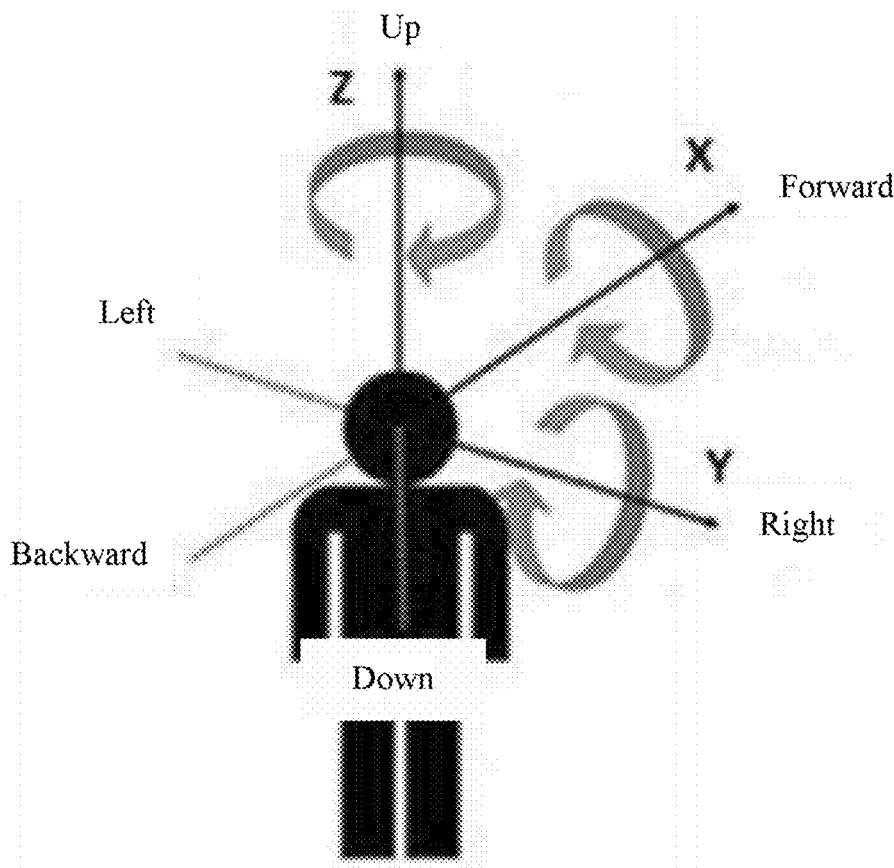
FIG. 3 is a schematic diagram of 6DoF.

6DoF: Based on 3DoF, the user also has DoF of free movement along the XYZ axes, and the corresponding media stream may be referred to as 6DoF media stream. FIG. 3 is a schematic diagram of 6DoF. 6DoF media refers to a 6DoF video, which means that the video can provide users with free movement viewpoints in XYZ directions in 3D space and a high DoF viewing experience with free rotation of the viewpoints around the XYZ axes. 6DoF media is a combination of videos from different views in the corresponding space captured by a camera array. To facilitate the expression, storage, compression, and processing of 6DoF media, the 6DoF media data is expressed as a combination of the following information: texture maps captured by a plurality of cameras, depth maps corresponding to multi-camera texture maps, and corresponding metadata for describing 6DoF media content. The metadata includes parameters of a plurality of cameras and description information of stitching layout and edge protection of 6DoF media. At the encoder side, the multi-camera texture map information and the corresponding depth map information are stitched, and the description data obtained by stitching is written into the metadata according to the defined syntax and semantics. The stitched multi-camera depth map and texture map information is encoded by flat video compression and then transmitted to a terminal for decoding, to synthesize 6DoF virtual viewpoints requested by users, thereby providing users with a viewing experience of 6DoF media.

Volumetric media: a type of immersive media, which may include, for example, a volumetric video. The volumetric video is 3D data representation. The current mainstream encoding is based on 2D video data, so original volumetric video data needs to be converted from 3D to 2D for encoding before encapsulation and transmission at a system layer. In the process of presenting the content of the volumetric video, it is necessary to convert 2D data into 3D data to express the final presented volumetric video. How the volumetric video is expressed in a 2D plane will directly affect the encapsulation, transmission, and content presentation of the final volumetric video at the system layer.

Atlas: indicating 2D region information on a plane frame, region information of 3D presentation space, a mapping relationship between the two pieces of region information, and necessary parameter information required for mapping. An atlas includes patches and a set of associated information that the patches correspond to a region in a 3D space of volumetric data. A patch is a rectangular region in the atlas, and is associated with volume information in a 3D space. Component data of 2D representation of the volumetric video is processed to generate patches. According to the position of the volumetric video represented in the geometric component data, a 2D plane region where the 2D representation of the volumetric video is located is divided into a plurality of rectangular regions of different sizes. One rectangular region is one patch. The patch includes necessary information to back project the rectangular region into a 3D space. The patches are packed to generate an atlas. The patches are put into 2D mesh, and it is ensured that valid parts of each patch do not overlap. The patches generated from a volumetric video can be packed into one or more atlases. Corresponding geometric data, attribute data, and placeholder data are generated based on atlas data. The atlas data, the geometric data, the attribute data, and the placeholder data are combined to generate final representation of the volumetric video on a 2D plane. The geometric component is mandatory, the placeholder component is conditional, and the attribute component is optional.

AVS: Audio Video Coding Standard.

ISO based media file format (ISOBMFF): a media file format based on the standard of International Standard Organization (ISO). ISOBMFF is an encapsulation standard for media files, and the most typical ISOBMFF file is a Moving Picture Experts Group 4 (MP4) file.

Depth map: As an expression of 3D scene information, a grayscale value of each pixel in the depth map may be used for representing a distance between a certain point in the scene and a camera.

The media file encapsulating method provided in the embodiments of this application may be performed by any electronic device. In the following exemplary descriptions, an example in which the encapsulation of a media file is performed by a server applied to an immersive system is used, but this application is not limited thereto.

Figure 4:
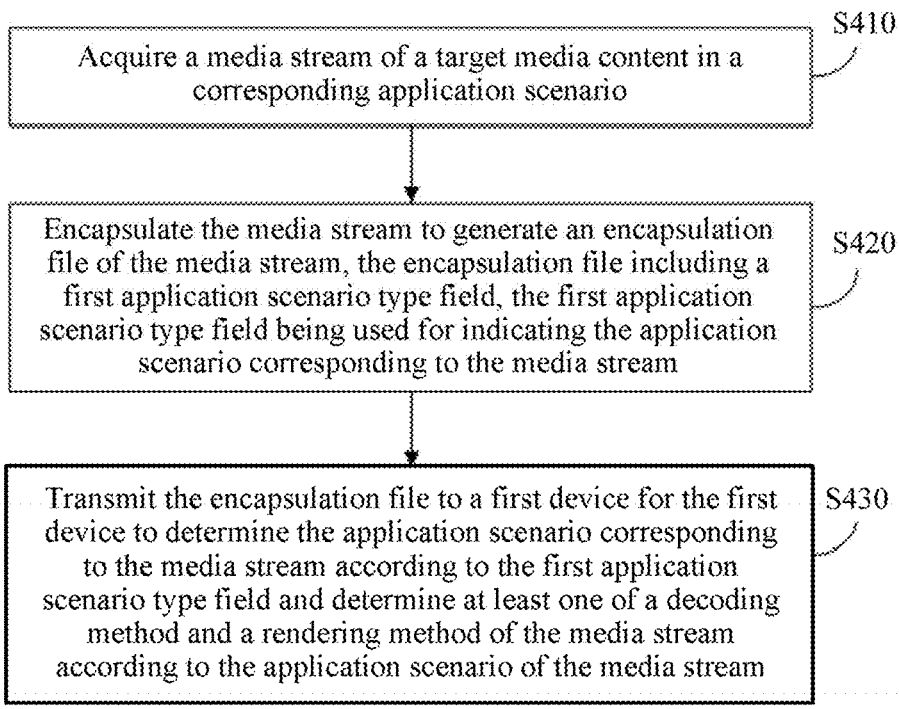
FIG. 4 is a schematic flowchart of a media file encapsulating method according to an embodiment of this application.

FIG. 4 is a schematic flowchart of a media file encapsulating method according to an embodiment of this application. As shown in FIG. 4, the method provided in this embodiment of this application may include the following steps.

Step S410. Acquire a media stream of a target media content in a corresponding application scenario.

In this embodiment of this application, the target media content may be any one of or a combination of video, audio, and image. In the following exemplary descriptions, a video is used as an example for description, but this application is not limited thereto.

In this embodiment of this application, the media stream may include any media stream that can be rendered in a 3D space, such as a 6DoF media stream and a 3DoF+ media stream. The following uses a 6DoF media stream as an example for description. The method provided in this embodiment of this application is applicable to 6DoF media content recording, on demand, live streaming, communication, program editing, production, and the like.

Immersive media may be divided into 3DoF media, 3DoF+ media, and 6DoF media according to DoF that a user can support when consuming the target media content. The 6DoF media may include a multi-view video and point cloud media.

The point cloud media may be further divided into V-PCC point cloud media and G-PCC point cloud media in terms of encoding methods.

The multi-view video is usually obtained by shooting the same scene by a camera array from a plurality of angles (also referred to as views) to form texture maps including texture information (such as color information) of the scene and depth maps including depth information (such as spatial distance information), together with mapping information from 2D plane frames to 3D presentation space, which form the 6DoF media that can be consumed on a user side.

It can be learned from the related art that the 6DoF media is applicable in a variety of forms. When decapsulating, decoding, and rendering the 6DoF media in different application scenarios, different operation steps and processing capabilities are required for a user.

In an example, the encoding of the multi-view video and V-PCC adopts the same set of rules, and the encoding of G-PCC adopts another set of rules, which indicates different encoding standards, and correspondingly, the decoding methods are also different.

In another example, although the encoding standard of the multi-view video and V-PCC is the same, one is to render an image to a 3D space, and the other is to render points to a 3D space, so there are some differences. In addition, the multi-view video requires texture maps and depth maps, and V-PCC may also require placeholder maps in addition to these, which is also a difference.

Step S420. Encapsulate the media stream to generate an encapsulation file of the media stream, the encapsulation file including a first application scenario type field, the first application scenario type field being used for indicating the application scenario corresponding to the media stream.

For example, in this embodiment of this application, in terms of the application of 6DoF media, different application scenarios of the 6DoF media may be distinguished.

Since the current industry defines 6DoF media as volumetric media, if different application scenarios cannot be distinguished during file encapsulation, unnecessary trouble will be brought to a user side on processing. For example, if different application scenarios corresponding to media files cannot be distinguished during encapsulation, it is necessary to decode a media stream before distinguishing. On the one hand, this leads to a waste of computing resources. On the other hand, since some intermediate nodes such as content delivery network (CDN) nodes do not have the decoding capability, decoding failure will occur.

Based on the above, these different applications have different processing methods and need to be distinguished. The advantage of distinguishing application scenarios during file encapsulation is that this information can be obtained at a very high level of a media file, so that computing resources can be saved, and some intermediate nodes without the decoding capability, such as CDN nodes, can also obtain this information.

Step S430. Transmit the encapsulation file to a first device for the first device to determine the application scenario corresponding to the media stream according to the first application scenario type field and determine at least one of a decoding method and a rendering method of the media stream according to the application scenario of the media stream.

In this embodiment of this application, the first device may be any intermediate node, or may be any user terminal that consumes the media stream. This is not limited in this application.

In the media file encapsulating method provided in this embodiment of this application, when an encapsulation file of a media stream in a corresponding application scenario is generated, a first application scenario type field is extended in the encapsulation file, and the first application scenario type field is used for indicating the application scenario corresponding to the media stream. Therefore, different application scenarios of different media streams can be distinguished in the encapsulation of media files. On the one hand, when the encapsulation file is transmitted to a first device, the first device may distinguish the application scenario of the media stream according to the first application scenario type field in the encapsulation file, and consequently may determine which decoding method and/or rendering method to adopt for the media stream according to the application scenario corresponding to the media stream, which can save the computing power and resources of the first device. On the other hand, the application scenario of the media stream can be determined in the encapsulation stage, so even if the first device does not have the decoding capability for the media stream, the application scenario corresponding to the media stream can be determined without waiting until the media stream is decoded.

Figure 5:
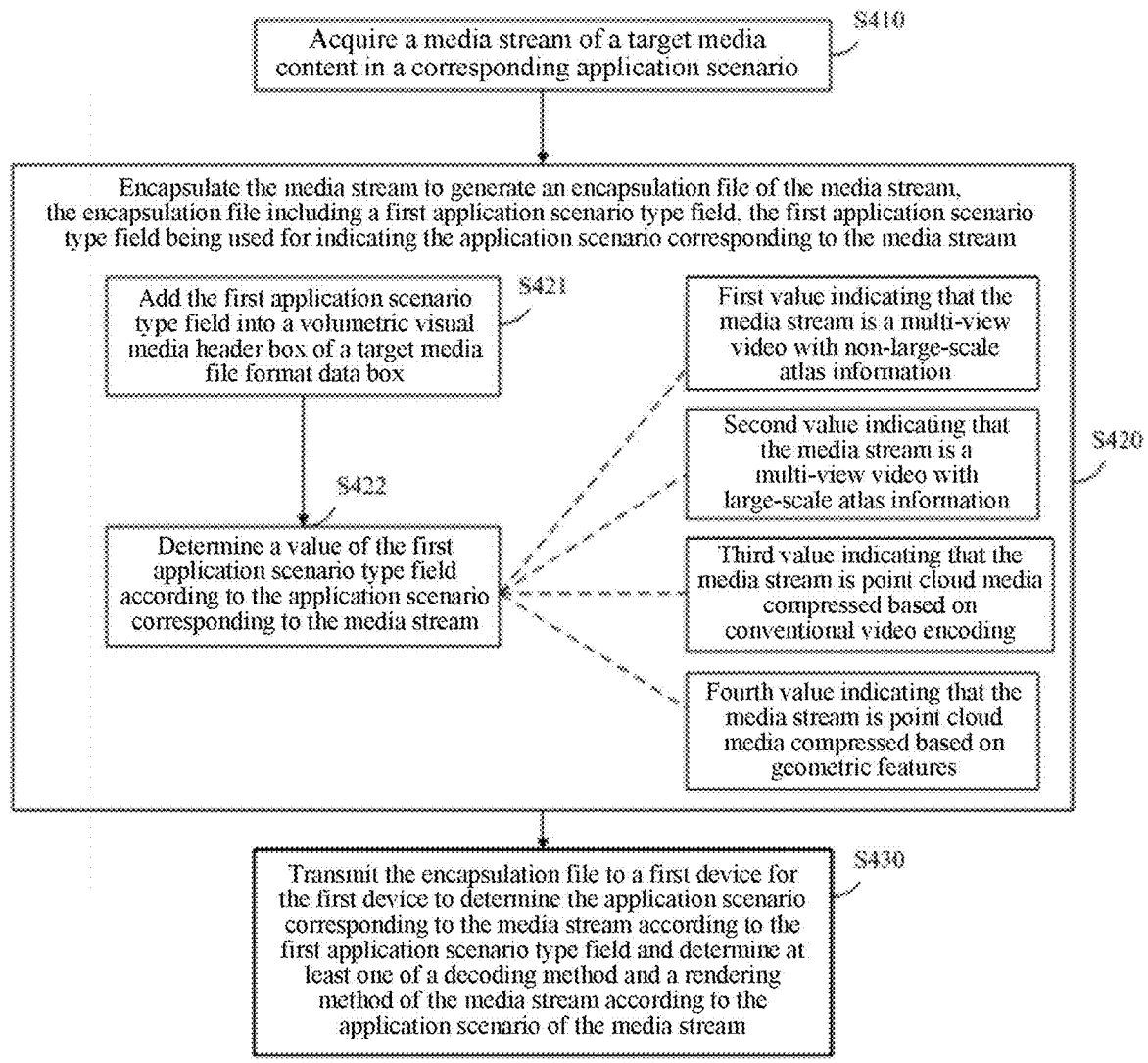
FIG. 5 is a schematic flowchart of a media file encapsulating method according to an embodiment of this application.

FIG. 5 is a schematic flowchart of a media file encapsulating method according to an embodiment of this application. As shown in FIG. 5, the method provided in this embodiment of this application may include the following steps.

Step S410 in this embodiment of FIG. 5 may refer to the above embodiment.

In this embodiment of FIG. 5, step S420 in the above embodiment in FIG. 4 may further include the following steps.

Step S421. Add the first application scenario type field into a volumetric visual media header box (such as Volumetric Visual Media Header Box below) of a target media file format data box.

In this embodiment of this application, to correspondingly identify the media file according to the application scenario of 6DoF media, several descriptive fields may be added at a system layer, including field extension at a file encapsulation level. For example, in the following exemplary descriptions, an extended ISOBMFF data box (as the target media file format data box) is used as an example for description, but this application is not limited thereto.

Step S422. Determine a value of the first application scenario type field according to the application scenario corresponding to the media stream.

In an exemplary embodiment, the value of the first application scenario type field may include any one of the following: a first value (for example, "0") indicating that the media stream is a multi-view video with non-large-scale atlas information; a second value (for example, "1") indicating that the media stream is a multi-view video with large-scale atlas information; a third value (for example, "2") indicating that the media stream is point cloud media compressed based on conventional video encoding; and a fourth value (for example, "3") indicating that the media stream is point cloud media compressed based on geometric features.

It is to be understood that the value of the first application scenario type field is not limited to indicating the above application scenarios, and may indicate more or fewer application scenarios, which may be set according to an actual requirement.

Step S430 in this embodiment of FIG. 5 may refer to the above embodiment.

In the media file encapsulating method provided in this embodiment of this application, by distinguishing different application scenarios of 6DoF media, the first device that consumes 6DoF media can perform targeted policy selection in the links of decapsulation, decoding, and rendering of the 6DoF media.

Figure 6:
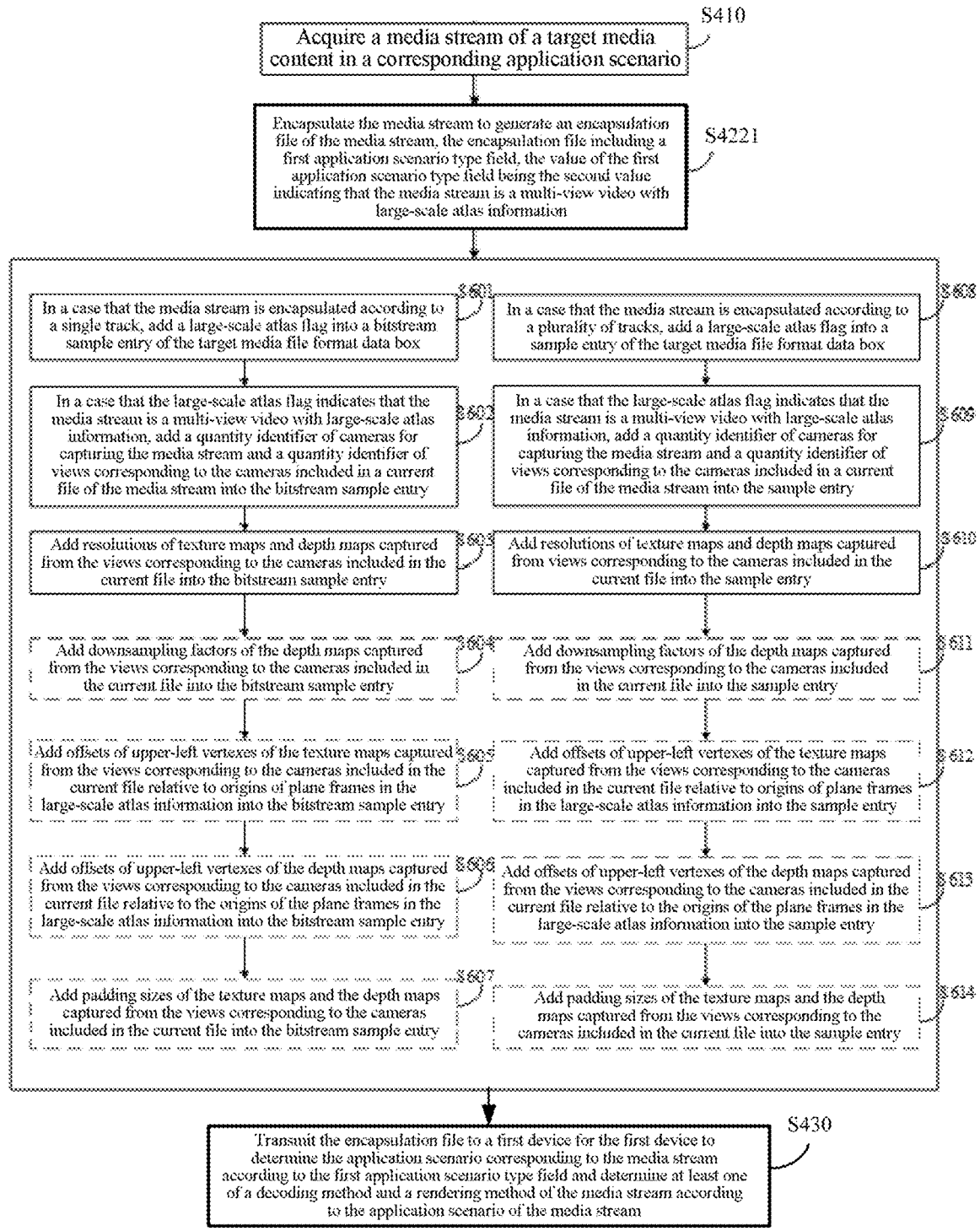
FIG. 6 is a schematic flowchart of a media file encapsulating method according to an embodiment of this application.

FIG. 6 is a schematic flowchart of a media file encapsulating method according to an embodiment of this application. As shown in FIG. 6, the method provided in this embodiment of this application may include the following steps.

Step S410 in this embodiment of FIG. 6 may refer to the above embodiment.

In this embodiment of FIG. 6, step S420 in the above embodiment may further include the following step S4221 of determining the media stream as a multi-view video with large-scale atlas information through the first application scenario type field during encapsulation.

Step S4221. Encapsulate the media stream to generate an encapsulation file of the media stream, the encapsulation file including a first application scenario type field (such as application_type below), the value of the first application scenario type field being the second value indicating that the media stream is a multi-view video with large-scale atlas information.

The mapping information from 2D plane frames to 3D presentation space of the multi-view video determines a 6DoF experience of the multi-view video. There are two methods for indicating this mapping relationship. One method defines an atlas to divide the region of 2D plane in a more detailed manner, and then indicates the mapping relationship between these 2D small regions and 3D space. This is referred to as non-large-scale atlas information, and the corresponding multi-view video is a multi-view video with non-large-scale atlas information. The other method is more crude, which directly identifies, from the perspective of a capture device (a camera is used as an example for description), the depth map and the texture map generated by each camera, and restores the mapping relationship of the corresponding depth map and texture map from 2D to 3D space according to parameters of each camera. This is referred to as large-scale atlas information, and the corresponding multi-view video is a multi-view video with large-scale atlas information. It may be understood that the large-scale atlas information and the non-large-scale atlas information are relative and do not directly limit the specific size.

The camera parameters are usually divided into camera extrinsics and intrinsics. The extrinsics usually include information such as the position and angle of the camera shooting. The intrinsics usually include information such as the optical center position and focal length of the camera.

It can be learned that the multi-view video in the 6DoF media may further include a multi-view video with large-scale atlas information and a multi-view video with non-large-scale atlas information, that is, the 6DoF media is applicable in a variety of forms. When decapsulating, decoding, and rendering the 6DoF media in different application scenarios, different operation steps and processing capabilities are required for a user.

For example, the large-scale atlas information and the non-large-scale atlas information are different in granularity of mapping and rendering from 2D region to 3D space. Assuming that the large-scale atlas information is 6 pieces of 2D puzzles mapped to 3D space, the non-large-scale atlas information may be 60 pieces of puzzles mapped to 3D space. Then, the complexities of the two mapping algorithms are definitely different, and the algorithm for the large-scale atlas information is simpler than the algorithm for the non-large-scale atlas information.

In particular, for the multi-view video, if its mapping relationship from 2D region to 3D space is obtained from camera parameters, that is, the multi-view video is a multi-view video with large-scale atlas information, then there is no need to define a smaller mapping relationship from 2D region to 3D space in the encapsulated file.

When the media stream is a multi-view video with large-scale atlas information, the method may further include the following steps.

Step S601. When the media stream is encapsulated according to a single track, add a large-scale atlas flag (such as large_scale_atlas_flag below) into a bitstream sample entry (such as V3CbitstreamSampleEntry below, but this application is not limited thereto) of the target media file format data box.

Step S602. When the large-scale atlas flag indicates that the media stream is a multi-view video with large-scale atlas information, add a quantity identifier of cameras (such as camera_count below) for capturing the media stream and a quantity identifier of views corresponding to the cameras (such as camera_count_contained below) included in a current file of the media stream into the bitstream sample entry.

Step S603. Add resolutions of texture maps and depth maps captured from the views corresponding to the cameras (such as camera_resolution_x and camera_resolution_y below) included in the current file into the bitstream sample entry.

Further referring to FIG. 6, the method further includes at least one of the following steps S604-S607.

Step S604. Add downsampling factors of the depth maps (such as depth_downsample_factor below) captured from the views corresponding to the cameras included in the current file into the bitstream sample entry.

Step S605. Add offsets of upper-left vertexes of the texture maps (such as texture_vetex_x and texture_vetex_y below) captured from the views corresponding to the cameras included in the current file relative to origins of plane frames in the large-scale atlas information into the bitstream sample entry.

Step S606. Add offsets of upper-left vertexes of the depth maps (such as depth_vetex_x and depth_vetex_y below) captured from the views corresponding to the cameras included in the current file relative to the origins of the plane frames in the large-scale atlas information into the bitstream sample entry.

Step S607. Add padding sizes of the texture maps and the depth maps (such as padding_size_texture and padding_size_depth below) captured from the views corresponding to the cameras included in the current file into the bitstream sample entry.

In this embodiment of this application, padding_size_texture and padding_size_depth respectively define the sizes of edge protection regions of each texture map and depth map, to protect edge abrupt-change regions for the compression of stitched image. The values of padding_size_texture and padding_size_depth represent the widths of the edge protection regions of the texture map and the depth map. padding_size_texture and padding_size_depth equal to 0 indicates that there is no edge protection.

Further referring to FIG. 6, when the media stream is a multi-view video with large-scale atlas information, the method may further include the following steps.

Step S608. When the media stream is encapsulated according to a plurality of tracks, add a large-scale atlas flag into a sample entry of the target media file format data box.

Step S609. When the large-scale atlas flag indicates that the media stream is a multi-view video with large-scale atlas information, add a quantity identifier of cameras for capturing the media stream and a quantity identifier of views corresponding to the cameras included in a current file of the media stream into the sample entry.

Step S610. Add resolutions of texture maps and depth maps captured from views corresponding to the cameras included in the current file into the sample entry.

Further referring to FIG. 6, the method further includes at least one of the following steps S611-S614.

Step S611. Add downsampling factors of the depth maps captured from the views corresponding to the cameras included in the current file into the sample entry.

Step S612. Add offsets of upper-left vertexes of the texture maps captured from the views corresponding to the cameras included in the current file relative to origins of plane frames in the large-scale atlas information into the sample entry.

Step S613. Add offsets of upper-left vertexes of the depth maps captured from the views corresponding to the cameras included in the current file relative to the origins of the plane frames in the large-scale atlas information into the sample entry.

Step S614. Add padding sizes of the texture maps and the depth maps captured from the views corresponding to the cameras included in the current file into the sample entry.

Step S430 in this embodiment of FIG. 6 may refer to the above embodiment.

In this embodiment of this application, the six_dof_stitching_layout field may be used to indicate a stitching method of depth maps and texture maps captured from views corresponding to the cameras in the 6DoF media, which is used for identifying a stitching layout of the texture maps and the depth maps of the 6DoF media. The specific values may be shown in Table 1.

TABLE 1

| Stitching layout of 6DoF media | |
| --- | --- |
| Value of six_dof_stitching_layout | Stitching layout of 6DoF media |
| 0 | Up-down stitching of depth map and texture map |
| 1 | Left-right stitching of depth map and texture map |
| 2 | Depth map 1/4 downsampling stitching |
| Others | Reserved |

FIG. 7 is a schematic diagram of an up-down stitching mode of 6DoF media according to an embodiment of this application.

When the value of six_dof_stitching_layout is 0, the stitching mode of the 6DoF media is up-down stitching. As shown in FIG. 7, in the up-down stitching mode, texture maps (such as a view 1 texture map, a view 2 texture map, a view 3 texture map, and a view 4 texture map in FIG. 7) captured by a plurality of cameras are arranged in sequence above the image, and corresponding depth maps (such as a view 1 depth map, a view 2 depth map, a view 3 depth map, and a view 4 depth map in FIG. 7) are arranged in sequence below the image.

The resolution of the 6DoF media after stitching is set to nWidth×nHeight, then a reconstruction module may calculate layout positions of the texture maps and the depth maps of the corresponding cameras by using the values of camera_resolution_x and camera_resolution_y, so as to further reconstruct the 6DoF media by using information of the texture maps and the depth maps of the plurality of cameras.

FIG. 8 is a schematic diagram of a left-right stitching mode of 6DoF media according to an embodiment of this application.

When the value of six_dof_stitching_layout is 1, the stitching mode of the 6DoF media is left-right stitching. As shown in FIG. 8, in the left-right stitching mode, texture maps (such as a view 1 texture map, a view 2 texture map, a view 3 texture map, and a view 4 texture map in FIG. 8) captured by a plurality of cameras are arranged in sequence on the left of the image, and corresponding depth maps (such as a view 1 depth map, a view 2 depth map, a view 3 depth map, and a view 4 depth map in FIG. 8) are arranged in sequence on the right of the image.

Figures 9, 10:
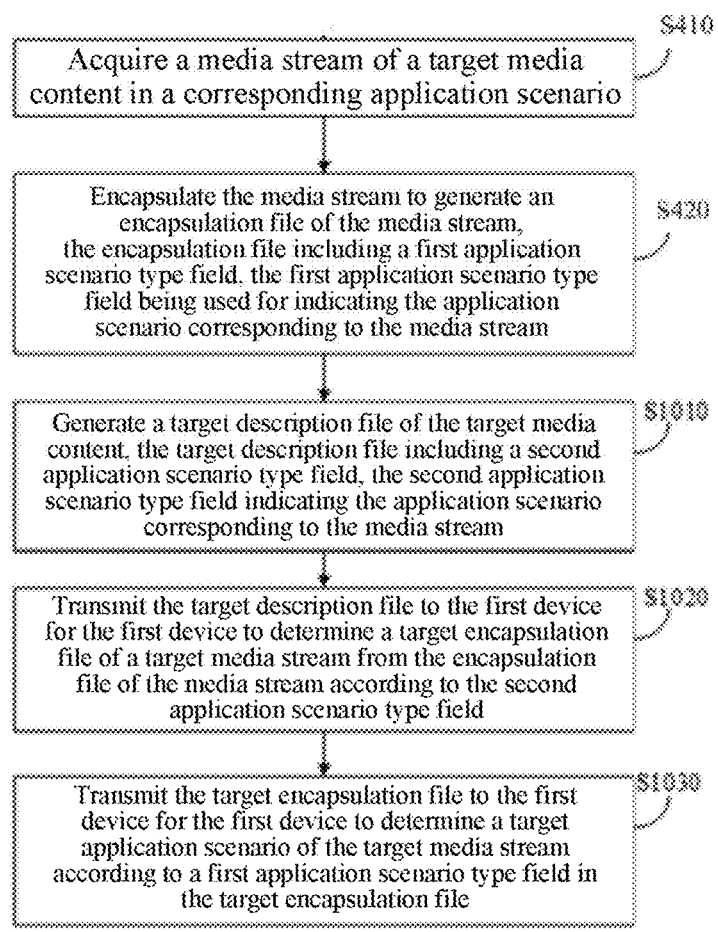
FIG. 9 is a schematic flowchart of a depth map ¼ resolution stitching mode of 6DoF media according to an embodiment of this application.
FIG. 10 is a schematic flowchart of a media file encapsulating method according to an embodiment of this application.

FIG. 9 is a schematic flowchart of a depth map 1/4 resolution stitching mode of 6DoF media according to an embodiment of this application.

When the value of six_dof_stitching_layout is 2, the stitching mode of the 6DoF media is depth map 1/4 downsampling stitching. As shown in FIG. 9, in the depth map ¼ downsampling stitching mode, after being downsampled at ¼ resolution, depth maps (such as a view 1 depth map, a view 2 depth map, a view 3 depth map, and a view 4 depth map in FIG. 9) are stitched to the lower right of texture maps (such as a view 1 texture map, a view 2 texture map, a view 3 texture map, and a view 4 texture map in FIG. 9). If the stitching of the depth maps cannot fill the rectangular region of a final stitched image, the remaining part is filled with a blank image.

The media file encapsulating method provided in this embodiment of this application can not only distinguish different application scenarios of 6DoF media, but also allow the first device that consumes 6DoF media to perform targeted policy selection in the links of decapsulation, decoding, and rendering of the 6DoF media. Further, for the application of the multi-view video in the 6DoF media, a method is provided to indicate information related to depth maps and texture maps of the multi-view video in file encapsulation, so that the encapsulation and combination of depth maps and texture maps from different views of the multi-view video are more flexible.

In an exemplary embodiment, the method may further include: generating a target description file of the target media content, the target description file including a second application scenario type field, the second application scenario type field being used for indicating the application scenario corresponding to the media stream; and transmitting the target description file to the first device for the first device to determine a target encapsulation file corresponding to a target media stream from the encapsulation file of the media stream according to the second application scenario type field.

Correspondingly, the transmitting the encapsulation file to a first device for the first device to determine the application scenario corresponding to the media stream according to the first application scenario type field may include: transmitting the target encapsulation file to the first device for the first device to determine a target application scenario corresponding to the target media stream according to a first application scenario type field in the target encapsulation file.

FIG. 10 is a schematic flowchart of a media file encapsulating method according to an embodiment of this application. As shown in FIG. 10, the method provided in this embodiment of this application may include the following steps.

Steps S410-S420 in this embodiment of FIG. 10 may refer to the above embodiment, and may further include the following steps.

Step S1010. Generate a target description file of the target media content, the target description file including a second application scenario type field (such as v3cAppType below), the second application scenario type field indicating the application scenario corresponding to the media stream.

In this embodiment of this application, several descriptive fields are added at a system layer. In addition to the field extension at a file encapsulation level, the fields at a signaling transmission level may also be extended. In the following embodiment, the form of supporting dynamic adaptive streaming over HTTP (DASH) media presentation description (MPD) signaling (as the target description file) is used as an example for description, the indication of the application scenario type of the 6DoF media and the indication of the large-scale atlas are defined.

Step S1020. Transmit the target description file to the first device for the first device to determine a target encapsulation file of a target media stream from the encapsulation file of the media stream according to the second application scenario type field.

Step S1030. Transmit the target encapsulation file to the first device for the first device to determine a target application scenario of the target media stream according to a first application scenario type field in the target encapsulation file.

The media file encapsulating method provided in this embodiment of this application can not only identify the application scenario corresponding to the media stream in the encapsulation file through the first application scenario type field, but also identify the application scenario corresponding to the media stream in the target description file through the second application scenario type field. In this case, the first device may first determine the media stream required according to the second application scenario type field in the target description file to request the corresponding target media stream from the server side, thereby reducing the data transmission and ensuring the actual capability that the requested target media stream can match the first device. After receiving the requested target media stream, the first device may further determine the target application scenario of the target media stream according to the first application scenario type field in the encapsulation file to acquire the decoding and rendering method required, reducing the computing resources.

Figure 11:
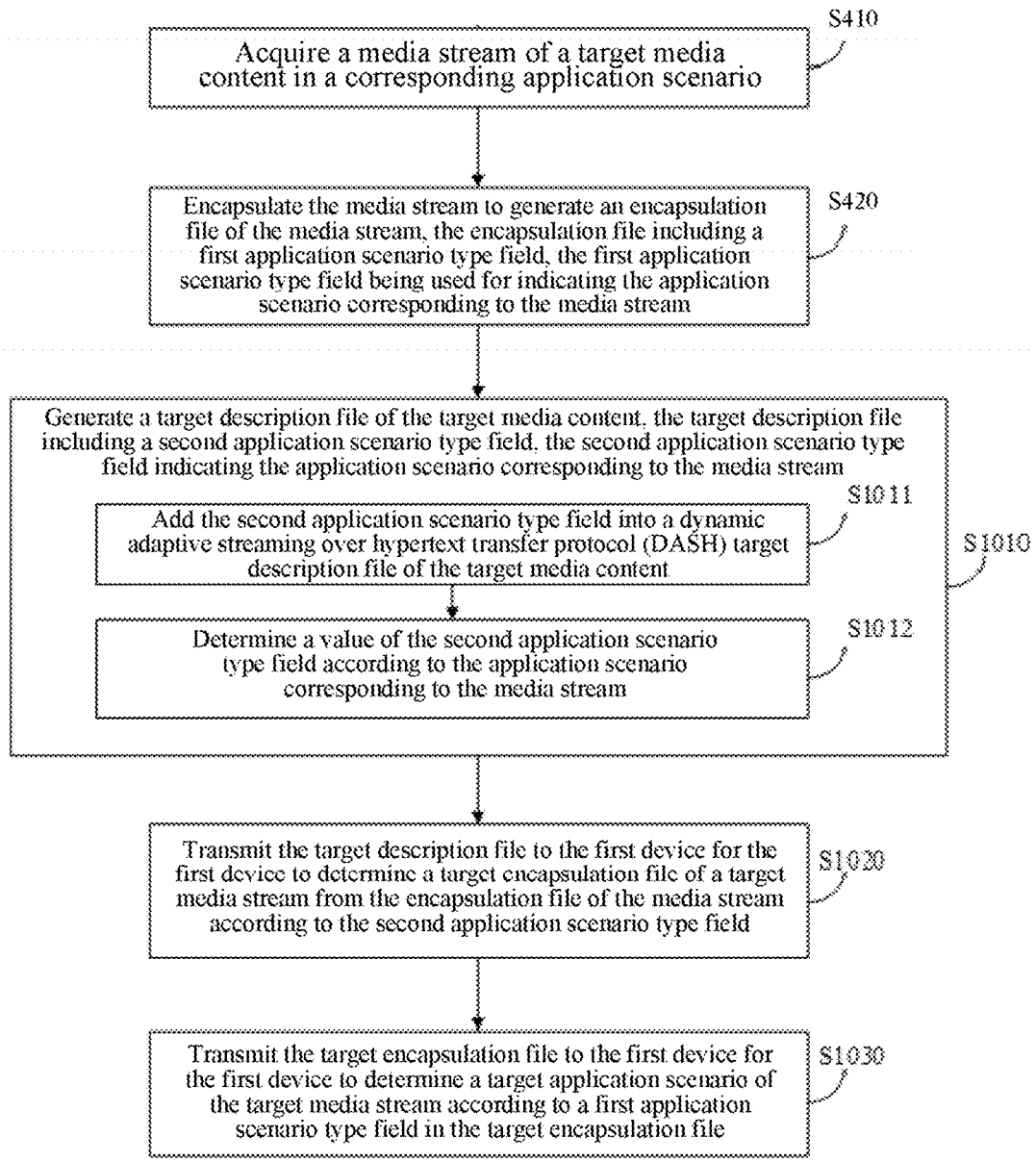
FIG. 11 is a schematic flowchart of a media file encapsulating method according to an embodiment of this application.

FIG. 11 is a schematic flowchart of a media file encapsulating method according to an embodiment of this application. As shown in FIG. 11, the method provided in this embodiment of this application may include the following steps.

Step S410-S420 in this embodiment of FIG. 11 may refer to the foregoing embodiment.

In this embodiment of FIG. 11, step S1010 in the above embodiment in FIG. 10 may further include the following steps.

Step S1011. Add the second application scenario type field into a dynamic adaptive streaming over hypertext transfer protocol (DASH) target description file of the target media content.

Step S1012. Determine a value of the second application scenario type field according to the application scenario corresponding to the media stream.

Steps S1020 and S1030 in this embodiment of FIG. 11 may refer to the above embodiment.

The media file encapsulating method provided in this embodiment of this application is described below. Using 6DoF media as an example, the method provided in this embodiment of this application may be applied to the indication of the application scenario of the 6DoF media and may include the following steps.

1. Correspondingly identify a media file according to an application scenario of 6DoF media.

2. In particular, for a multi-view video, determine whether the mapping from 2D plane frames to 3D space is performed by using an output of cameras for capturing as a unit. That is, the mapping from 2D plane frames to 3D space is performed by using a texture map and a depth map captured by each camera as a unit, which is referred to as large-scale atlas information. If it is necessary to further finely divide the texture map and depth map captured by each camera, the mapping that indicates a set of 2D small regions after division to 3D space is referred to as non-large-scale atlas information.

3. If the mapping of the multi-view video from 2D plane frames to 3D space is performed by using an output of cameras for capturing as a unit, related information outputted by different cameras for capturing is indicated in the encapsulation file.

In this embodiment, several descriptive fields may be added at a system layer, including field extension at a file encapsulation level and field extension at a signaling transmission level, so as to support the above steps of this embodiment of this application. Using the form of an extended ISOBMFF data box and DASH MPD signaling as an example, the following defines the application type indication and large-scale atlas indication of 6DoF media, specifically as follows (the extension is identified in italics).

1. ISOBMFF Data Box Extension

The mathematical operators and precedence used in this section refer to the C programming language. Unless otherwise specified, the convention numbering and counting starts from 0.

```
aligned(8) class VolumetricVisualMediaHeaderBox
    extends FullBox('vvhd', version = 0, 1) {
    unsigned int(8) application_type;//first application scenario type field
of 8-bit unsigned integer
    }
    aligned(8) class V3CBitstreamSampleEntry( ) extends
VolumetricVisualSampleEntry ('v3e1') { //because 6DoF media may be
encapsulated according to a single track or a plurality of tracks, this
structure corresponds to the case according to a single track.
    V3CConfigurationBox config;
    unsigned int(1) large_scale_atlas_flag;
    bit(7) reserved; //reserved fields, general fields need to be an integer
number of bytes, so reserved bits are required for supplementation.
    if(large_scale_atlas_flag == 1){//indicate as multi-view video
with large-scale atlas information
        unsigned int(8) camera_count;
        unsigned int(8) camera_count_contained;
        unsigned int(8) padding_size_depth;
        unsigned int(8) padding_size_texture;
        for(i=0; i<camera_count_contained; i++){
            unsigned int(8) camera_id;
            float(32) camera_resolution_x;// float(32) represents 32
consecutive binary bits of a specific value
            float(32) camera_resolution_y;
            unsigned int(8) depth_downsample_factor;
            unsigned int(32) texture_vetex_x;
            unsigned int(32) texture_vetex_y;
            unsigned int(32) depth_vetex_x;
            unsigned int(32) depth_vetex_y;
        }
    }
}
    aligned(8) class V3CSampleEntry( ) extends
VolumetricVisualSampleEntry
('v3c1') {  //this structure corresponds to the case according to a plurality
of tracks.
    V3CConfigurationBox config;
    V3CUnitHeaderBox unit_header;
    unsigned int(1) large_scale_atlas_flag;
    bit(7) reserved;
    if(large_scale_atlas_flag == 1){
        unsigned int(8) camera_count;
        unsigned int(8) camera_count_contained;
        unsigned int(8) padding_size_depth;
        unsigned int(8) padding_size_texture;
        for(i=0; i<camera_count_contained; i++){
            unsigned int(8) camera_id;
            float(32) camera_resolution_x;
            float(32) camera_resolution_y;
            unsigned int(8) depth_downsample_factor;
            unsigned int(32) texture_vetex_x;
            unsigned int(32) texture_vetex_y;
            unsigned int(32) depth_vetex_x;
            unsigned int(32) depth_vetex_y;
        }
    }
}
```

In this embodiment of this application, the first application scenario type field application_type indicates the application scenario type of the 6DoF media, with a specific value including but not limited to the content shown in Table 2:

TABLE 2

| Value | Semantics |
| --- | --- |
| 0 | Multi-view video (non-large-scale atlas information) |
| 1 | Multi-view video (large-scale atlas information) |
| 2 | V-PCC point cloud media |
| 3 | G-PCC point cloud media |

The large_scale_atlas_flag indicates whether the atlas information is large-scale atlas information, that is, whether the atlas information can be obtained only through related information such as camera parameters. It is assumed that large_scale_atlas_flag equal to 1 indicates a multi-view video (large-scale atlas information), and large_scale_atlas_flag equal to 0 indicates a multi-view video (non-large-scale atlas information).

It can be learned from Table 2 that the first application scenario type field application_type can already indicate a multi-view video with large-scale atlas information. Considering that the indication of application_type is relatively upper, large_scale_atlas_flag is added to facilitate parsing. It is enough to use only one, but because it is not sure which field will be used, the information herein is redundant.

The camera_count is used for indicating the quantity of all cameras for capturing 6DoF media, referred to as a quantity identifier of cameras for capturing the media stream. The value of camera_number is 1-255. The camera_count_contained is used for representing the quantity of views corresponding to cameras included in a current file of 6DoF media, referred to as a quantity identifier of views corresponding to cameras included in a current file.

The padding_size_depth represents the padding size of the depth map. The padding_size_texture represents the padding size of the texture map. During video encoding, some protection is usually added to improve the fault tolerance of video encoding, that is, some extra pixels are filled at the edge of an image frame.

The camera_id represents a camera identifier corresponding to each view. The camera_resolution_x and camera_resolution_y represent the width and height of resolution of the texture map and depth map captured by the camera, respectively representing the resolutions captured by the corresponding camera in X and Y directions. The depth_downsample_factor represents a downsampling factor of a corresponding depth map. The width and height of the actual resolution of the depth map is $1/2^{depth\_downsample\_factor}$ of the width and height of the resolution captured by the camera.

The depth_vetex_x and depth_vetex_y respectively represent X and Y component values in the offset of the upper-left vertex of the corresponding depth map relative to the origin of the plane frame (the upper-left vertex of the plane frame).

The texture_vetex_x and texture_vetex_y respectively represent X and Y component values in the offset of the upper-left vertex of the corresponding texture map relative to the origin of the plane frame (the upper-left vertex of the plane frame).

2. DASH MPD Signaling Extension

The second application scenario type field v3cAppType can be extended in the DASH MPD signaling shown in Table 3.

TABLE 3

Semantics of Representation element

| Element or Attribute Name | Use | Description |
|---|---|---|
| Representation | M | This element contains a description of a Representation. |
| @id | M | Unique identifier for this Representation within the Period. The string shall only contain characters that permit to form a valid HTTP-URL according to RFC 1738. |
| @bandwidth | M | The minimum bandwidth of a hypothetical constant bitrate channel in bits per second (bps) over which the Representation (i.e., the collection of all Segments of a Representation) can be continuously delivered such that a client, after buffering for exactly @minBufferTime when accessing a Representation at any RAP can be assured of having enough data for continuous playout. |
| @v3cAppType | O | The field indicates the application scenario type of the current Representation, ranging from 0 to 3, respectively corresponding to multi-view video (non-large-scale atlas information), multi-view video (large-scale atlas information), V-PCC point cloud media, and G-PCC point cloud media. |
| . . . . . . | . . . . . . | . . . . . . |

Corresponding to the embodiment of FIG. 7, it is assumed that there is a multi-view video A on the server side, and the atlas information of the multi-view video A is large-scale atlas information.

In this case: application_type=1;
large_scale_atlas_flag=1: camera_count=4;
camera_count_contained=4;
padding_size_depth=0; padding_size_texture=0;
 {camera_id=1; camera_resolution_x=100;
camera_resolution_y=100;
depth_downsample_factor=0; texture_vetex =(0,0); depth_vetex = )0,200) }//view 1 texture map and view 1 depth map
 {camera_id=2; camera_resolution_x=100; camera_resolution_y=100;
depth_downsample_factor=0; texture_vetex =(100,0); depth_vetex = )100,200) }//view 2 texture map and view 2 depth map
 {camera_id=3; camera_resolution_x=100; camera_resolution_y=100;
depth_downsample_factor=0; texture_vetex =(0,100); depth_vetex = )0,300) }//view 3 texture map and view 3 depth map
 {camera_id=4; camera_resolution_x=100; camera_resolution_y=100;
depth_downsample_factor=0; texture_vetex =(100,100);
depth_vetex = )100,300) }//view 4 texture map and view 4 depth map The above system description corresponds to the data structure of each region of the plane frame in FIG. 7.

Corresponding to the embodiment of FIG. 8, it is assumed that there is a multi-view video A on the server side, and the atlas information of the multi-view video A is large-scale atlas information.

In this case: application_type=1;
large_scale_atlas_flag=1: camera_count=4;
camera_count_contained=4;
padding_size_depth=0; padding_size_texture=0;
 {camera_id=1; camera_resolution_x=100; camera_resolution_y=100;
depth_downsample_factor=0; texture_vetex =(0,0); depth_vetex = (200,0) }
 {camera_id=2; camera_resolution_x=100; camera_resolution_y=100;
depth_downsample_factor=0; texture_vetex =(100,0); depth_vetex = (300,0) }
 {camera_id=3; camera_resolution_x=100; camera_resolution_y=100;
depth_downsample_factor=0; texture_vetex =(0,100); depth_vetex = (200,100) }
 {camera_id=4; camera_resolution_x=100; camera_resolution_y=100;
depth_downsample_factor=0; texture_vetex =(100,100);
depth_vetex = (300,100) }

The above system description corresponds to the data structure of each region of the plane frame in FIG. 8.

Corresponding to the embodiment of FIG. 9, it is assumed that there is a multi-view video A on the server side, and the atlas information of the multi-view video A is large-scale atlas information.

In this case: application_type=1;
large_scale_atlas_flag=1: camera_count=4;
camera_count_contained=4;
padding_size_depth=0; padding_size_texture=0;
 {camera_id=1; camera_resolution_x=100; camera_resolution_y=100;
depth_downsample_factor=1; texture_vetex =(0,0); depth_vetex = (0,200) }
 {camera_id=2; camera_resolution_x=100; camera_resolution_y=100;
depth_downsample_factor=1; texture_vetex =(100,0); depth_vetex = (50,200) }
 {camera_id=3; camera_resolution_x=100; camera_resolution_y=100;
depth_downsample_factor=1; texture_vetex =(0,100); depth_vetex = (100,200) }
 {camera_id=4; camera_resolution_x=100; camera_resolution_y=100;
depth_downsample_factor=1; texture_vetex =(100,100);
depth_vetex = (150,200) }

The above system description corresponds to the data structure of each region of the plane frame in FIG. 9.

There is no absolute value range for padding_size_depth and padding_size_texture, and different values have no influence on the method provided in this embodiment of this application. This solution only indicates the size of padding_size_depth and padding_size_texture. As for why the sizes of padding_size_depth and padding_size_texture are like this, it is determined by an encoding algorithm, and has nothing to do with the method provided in this embodiment of this application.

The camera_resolution_x and camera_resolution_y are used to calculate the width and height of the actual resolution of the depth map, which is the resolution of each camera. The multi-view video is shot by a plurality of cameras, and resolutions of different cameras may be different. The width and height of resolutions of all views are set to 100 pixels only for the convenience of exemplification, and are not actually limited to this.

It may be understood that, not limited to the above combination, the method provided in this embodiment of this application may give corresponding indications to any combination.

After receiving an encapsulation file of a multi-view video transmitted by a server side, a client installed on a first device parses corresponding fields in the encapsulation file to map regions of plane frames of the multi-view video to texture maps and depth maps of different cameras; and parses camera parameter information in a media stream of the multi-view video to restore the regions of the plane frames to a 3D rendering presentation region, so as to consume the multi-view video.

The following description is made corresponding to the above embodiment of FIG. 10. Assuming that for the same target media content, there are 3 different forms of 6DoF media on the server side, respectively a multi-view video A (large-scale atlas information), V-PCC point cloud media B, and G-PCC point cloud media C, when encapsulating the three media streams, the server side assigns a corresponding value to the application_type field in the VolumetricVisualMediaHeaderBox. Specifically, the multi-view video A: application_type=1; the V-PCC point cloud media B: application_type=2; the G-PCC point cloud media C: application_type=3.

In addition, the application scenario types of the three Representations multi-view video A (large-scale atlas information), V-PCC point cloud media B, and G-PCC point cloud media C are described in the MPD file, that is, the values of the v3cAppType field are respectively the multi-view video A: v3cAppType=1; the V-PCC point cloud media B: v3cAppType=2; the G-PCC point cloud media C: v3cAppType=3.

Then, the server delivers a target description file corresponding to the MPD signaling to the client installed on the first device.

After receiving the target description file corresponding to the MPD signaling transmitted by the server side, the client requests a target encapsulation file of a target media stream of a corresponding application scenario type according to the device capabilities and presentation requirements of the client. Assuming that the processing capability of the client of the first device is low, the client requests the target encapsulation file of the multi-view video A.

Then, the server side transmits the target encapsulation file of the multi-view video A to the client of the first device.

After receiving the target encapsulation file of the multi-view video A transmitted by the server side, the client of the first device determines an application scenario type of the current 6DoF media file according to the application_type field in the VolumetricVisualMediaHeaderBox for corresponding processing. Different application scenario types have different decoding and rendering algorithms.

Using a multi-view video as an example, application_type=1 indicates that the atlas information of the multi-view video uses the depth map and texture map captured by the camera as a unit, so the client may process the multi-view video by using a relatively simple processing algorithm.

In other embodiments, in addition to DASH MPD, similar extension may also be performed on similar signaling files to indicate application scenario types of different media files in the signaling files.

In an exemplary embodiment, the acquiring a media stream of a target media content in a corresponding application scenario may include: receiving a first encapsulation file of a first multi-view video transmitted by a second device and a second encapsulation file of a second multi-view video transmitted by a third device; decapsulating the first encapsulation file and the second encapsulation file respectively to obtain the first multi-view video and the second multi-view video; decoding the first multi-view video and the second multi-view video respectively to obtain a first depth map and a first texture map in the first multi-view video, and a second depth map and a second texture map in the second multi-view video; and obtaining a merged multi-view video according to the first depth map, the second depth map, the first texture map, and the second texture map.

A first quantity of cameras may be installed on the second device, a second quantity of cameras may be installed on the third device, and the second device and the third device perform multi-view video capturing and shooting for a same scene by using the respective cameras to obtain the first multi-view video and the second multi-view video.

The first encapsulation file and the second encapsulation file may include the first application scenario type fields respectively, and values of the first application scenario type fields in the first encapsulation file and the second encapsulation file are respectively second values used for indicating that the first multi-view video and the second multi-view video are multi-view videos with large-scale atlas information.

Figure 12:
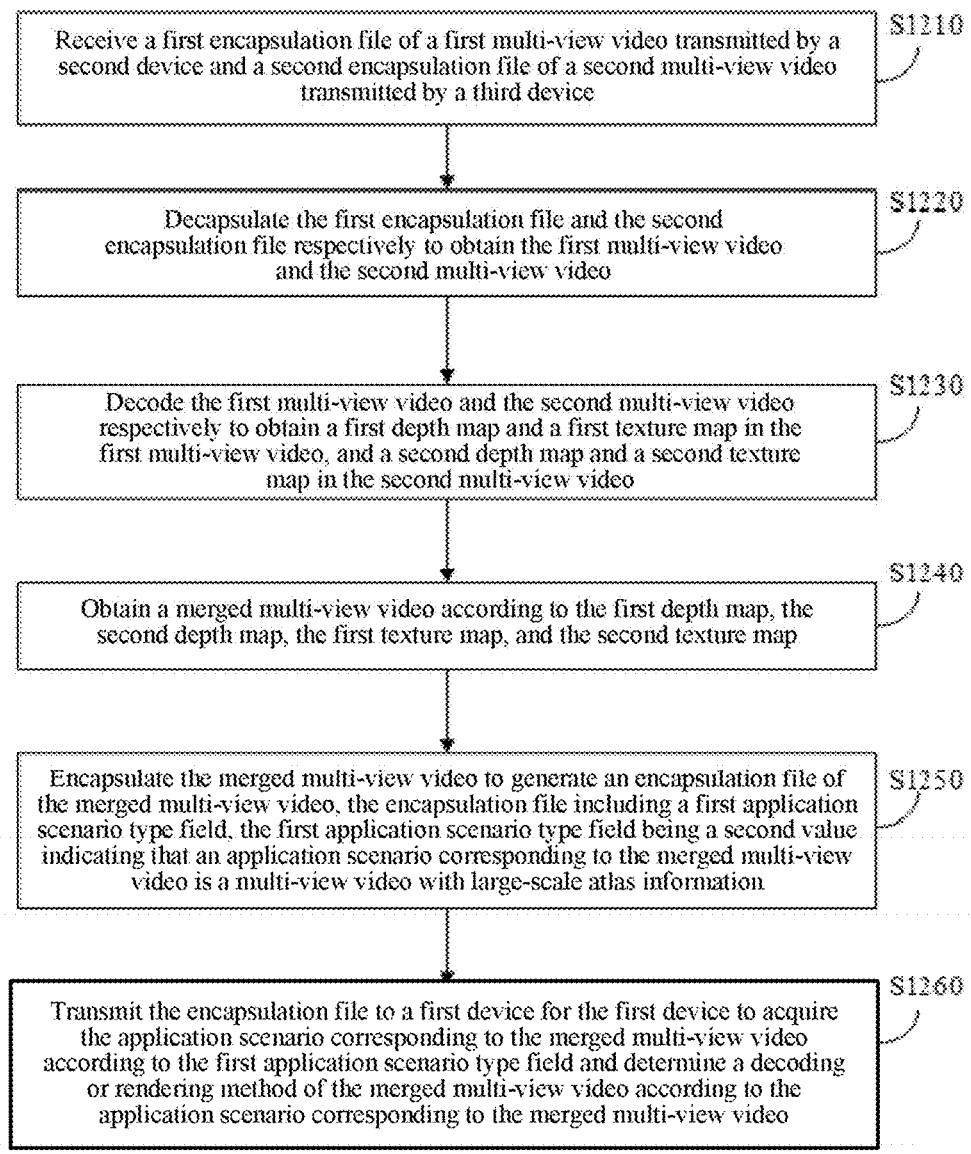
FIG. 12 is a schematic flowchart of a media file encapsulating method according to an embodiment of this application.

FIG. 12 is a schematic flowchart of a media file encapsulating method according to an embodiment of this application. As shown in FIG. 12, the method provided in this embodiment of this application may include the following steps.

Step S1210. Receive a first encapsulation file of a first multi-view video transmitted by a second device and a second encapsulation file of a second multi-view video transmitted by a third device.

Step S1220. Decapsulate the first encapsulation file and the second encapsulation file respectively to obtain the first multi-view video and the second multi-view video.

Step S1230. Decode the first multi-view video and the second multi-view video respectively to obtain a first depth map and a first texture map in the first multi-view video, and a second depth map and a second texture map in the second multi-view video.

Step S1240. Obtain a merged multi-view video according to the first depth map, the second depth map, the first texture map, and the second texture map.

Step S1250. Encapsulate the merged multi-view video to generate an encapsulation file of the merged multi-view video, the encapsulation file including a first application scenario type field, the first application scenario type field being a second value used for indicating that an application scenario corresponding to the merged multi-view video is a multi-view video with large-scale atlas information.

Step S1260. Transmit the encapsulation file to a first device for the first device to acquire the application scenario corresponding to the merged multi-view video according to the first application scenario type field and determine a decoding or rendering method of the merged multi-view video according to the application scenario corresponding to the merged multi-view video.

Figure 13:
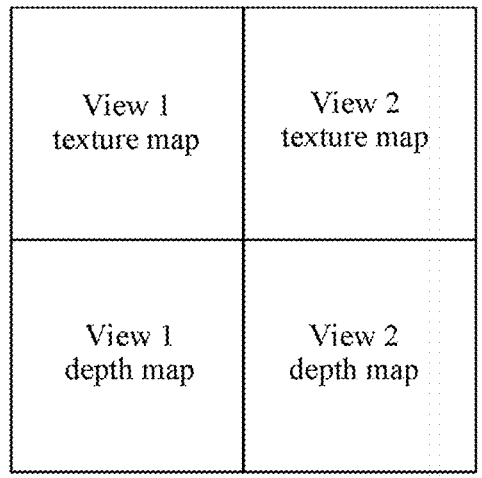
FIG. 13 is a schematic diagram of an up-down stitching mode of a first multi-view video according to an embodiment of this application.
Figure 14:
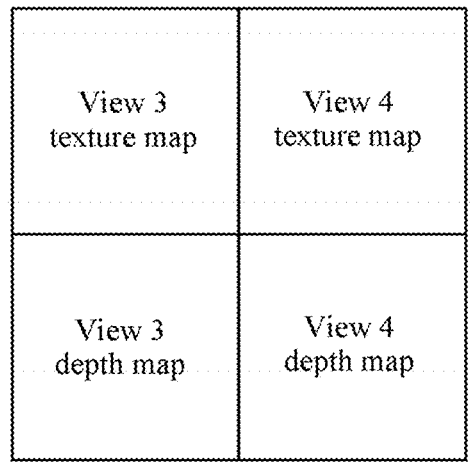
FIG. 14 is a schematic diagram of an up-down stitching mode of a second multi-view video according to an embodiment of this application.

The following exemplarily describes the method provided in the embodiment of FIG. 12 with reference to FIG. 13 and FIG. 14. It is assumed that the second device and the third device are an unmanned aerial vehicle A and an unmanned aerial vehicle B respectively (but this application is not limited thereto), and 2 cameras are installed on the unmanned aerial vehicle A and the unmanned aerial vehicle B respectively (that is, both a first quantity and a second quantity are equal to 2, but this application is not limited thereto, which may be set according to an actual scenario). When multi-view video capturing and shooting is performed on the same scene by using the unmanned aerial vehicle A and the unmanned aerial vehicle B, in the process of capturing and producing a first multi-view video by using the unmanned aerial vehicle A, a first encapsulation file for encapsulating the first multi-view video is as follows:

```
application_type=1;
large_scale_atlas_flag=1: camera_count=4;
camera_count_contained=2;
padding_size_depth=0; padding_size_texture=0;
{camera_id=1; camera_resolution_x=100; camera_resolution_y=100;
depth_downsample_factor=1; texture_vetex =(0,0); depth_vetex =
)0,100) }//view 1 texture map and view 1 depth map
{camera_id=2; camera_resolution_x=100; camera_resolution_y=100;
depth_downsample_factor=1; texture_vetex =(100,0); depth_vetex =
)100,100) }//view 2 texture map and view 2 depth map
```

The above system description corresponds to the data structure of each region of the plane frame in FIG. 13. The up-down stitching mode is used as an example for description.

In the process of capturing and producing a second multi-view video by using the unmanned aerial vehicle B, a second encapsulation file for encapsulating the second multi-view video is as follows:

```
application_type=1;
large_scale_atlas_flag=1: camera_count=4;
camera_count_contained=2;
padding_size_depth=0; padding_size_texture=0;
{camera_id=3; camera_resolution_x=100; camera_resolution_y=100;
depth_downsample_factor=1; texture_vetex =(0,0); depth_vetex =
)0,100) }//view 3 texture map and view 3 depth map
{camera_id=4; camera_resolution_x=100; camera_resolution_y=100;
depth_downsample_factor=1; texture_vetex =(100,0); depth_vetex =
)100,100) }//view 4 texture map and view 4 depth map
```

The above system description corresponds to the data structure of each region of the plane frame in FIG. 14.

On the server side, after receiving the first encapsulation file and the second encapsulation file shot by different unmanned aerial vehicles, the server side decapsulates and decodes the first encapsulation file and the second encapsulation file, merges all depth maps and texture maps, and obtains a merged multi-view video assuming that depth map downsampling is performed.

The depth map is not as important as the texture map, and the data volume can be reduced after downsampling. This embodiment of this application indicates this scenario, but limit this scenario.

After the merged multi-view video is encapsulated, the following encapsulation file can be obtained:

```
application_type=1;
large_scale_atlas_flag=1: camera_count=4;
camera_count_contained=4;
padding_size_depth=0; padding_size_texture=0;
{camera_id=1; camera_resolution_x=100; camera_resolution_y=100;
depth_downsample_factor=1; texture_vetex =(0,0); depth_vetex =
(0,200) }
{camera_id=2; camera_resolution_x=100; camera_resolution_y=100;
depth_downsample_factor=1; texture_vetex =(100,0); depth_vetex =
(50,200) }
{camera_id=3; camera_resolution_x=100; camera_resolution_y=100;
depth_downsample_factor=1; texture_vetex =(0,100); depth_vetex =
(100,200) }
{camera_id=4; camera_resolution_x=100; camera_resolution_y=100;
depth_downsample_factor=1; texture_vetex =(100,100);
depth_vetex = (150,200) }
```

The above system description corresponds to the data structure of each region of the plane frame in FIG. 9.

After receiving an encapsulation file of a merged multi-view video transmitted by a server side, a client of a first device parses corresponding fields in the encapsulation file to map regions of plane frames of the merged multi-view video to texture maps and depth maps of different cameras; and parses camera parameter information in a media stream of the merged multi-view video to restore the regions of the plane frames to a 3D rendering presentation region, so as to consume the merged multi-view video.

In the media file encapsulating method provided in this embodiment of this application, for the application of the multi-view video in the 6DoF media, a method is provided to indicate information related to depth maps and texture maps of the multi-view video in file encapsulation, so that the encapsulation and combination of depth maps and texture maps from different views of the multi-view video are more flexible. The method may support different application scenarios. As described in the above embodiments, some scenes are shot by different devices and encapsulated into two files. The method provided in this embodiment of this application can associate these two files for combined consumption. Otherwise, in the above embodiments, two files can only be presented separately, and cannot be presented jointly.

The media file decapsulating method provided in the embodiments of this application may be performed by any electronic device. In the following exemplary descriptions, an example in which the media file decapsulating method is applied to an intermediate node or a first device (such as a player side) of an immersive system is used, but this application is not limited thereto.

Figure 15:
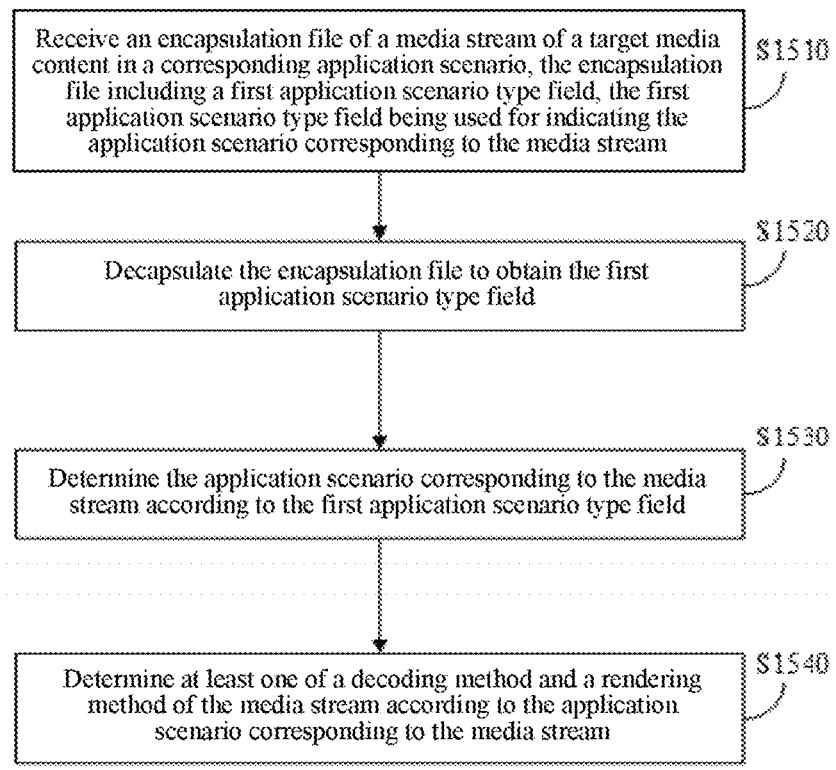
FIG. 15 is a schematic flowchart of a media file decapsulating method according to an embodiment of this application.

FIG. 15 is a schematic flowchart of a media file decapsulating method according to an embodiment of this application. As shown in FIG. 15, the method provided in this embodiment of this application may include the following steps.

Step S1510. Receive an encapsulation file of a media stream of a target media content in a corresponding application scenario, the encapsulation file including a first application scenario type field, the first application scenario type field being used for indicating the application scenario corresponding to the media stream.

In an exemplary embodiment, the method may further include: receiving a target description file of the target media content, the target description file including a second application scenario type field, the second application scenario type field being used for indicating the application scenario corresponding to the media stream; and determining a target encapsulation file of a target media stream from the encapsulation file of the media stream according to the second application scenario type field.

Correspondingly, the receiving an encapsulation file of a media stream of a target media content in a corresponding application scenario may include: receiving the target encapsulation file to determine a target application scenario corresponding to the target media stream according to a first application scenario type field in the target encapsulation file.

Step S1520. Decapsulate the encapsulation file to obtain the first application scenario type field.

Step S1530. Determine the application scenario corresponding to the media stream according to the first application scenario type field.

Step S1540. Determine at least one of a decoding method and a rendering method of the media stream according to the application scenario corresponding to the media stream.

In an exemplary embodiment, when a value of the first application scenario type field is a second value indicating that the media stream is a multi-view video with large-scale atlas information, the method may further include: parsing the encapsulation file to obtain mapping relationships between plane frames in the large-scale atlas information and texture maps and depth maps captured from views corresponding to cameras included in the media stream; decoding the media stream to obtain camera parameters in the media stream; and presenting the multi-view video in a 3-dimension (3D) space according to the mapping relationships and the camera parameters.

Other contents of the media file decapsulating method provided in this embodiment of this application may refer to the media file encapsulating method in the above embodiments.

The media file encapsulating apparatus provided in the embodiments of this application may be configured on any electronic device. In the following exemplary descriptions, an example in which the media file encapsulating apparatus is configured on a server side of an immersive system is used, but this application is not limited thereto.

Figure 16:
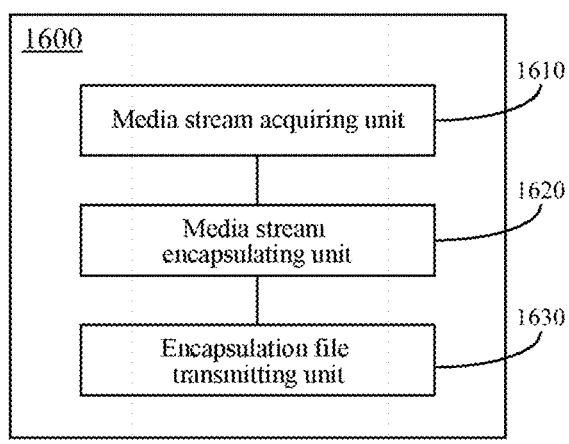
FIG. 16 is a schematic block diagram of a media file encapsulating apparatus according to an embodiment of this application.

FIG. 16 is a schematic block diagram of a media file encapsulating apparatus according to an embodiment of this application. As shown in FIG. 16, a media file encapsulating apparatus 1600 provided in this embodiment of this application may include a media stream acquiring unit 1610, a media stream encapsulating unit 1620, and an encapsulation file transmitting unit 1630.

In this embodiment of this application, the media stream acquiring unit 1610 may be configured to acquire a media stream of a target media content in a corresponding application scenario; the media stream encapsulating unit 1620 may be configured to encapsulate the media stream to generate an encapsulation file of the media stream, the encapsulation file including a first application scenario type field, the first application scenario type field being used for indicating the application scenario corresponding to the media stream; and the encapsulation file transmitting unit 1640 may be configured to transmit the encapsulation file to a first device for the first device to determine the application scenario corresponding to the media stream according to the first application scenario type field and determine at least one of a decoding method and a rendering method of the media stream according to the application scenario corresponding to the media stream.

In the media file encapsulating apparatus provided in this embodiment of this application, when an encapsulation file of a media stream in a corresponding application scenario is generated, a first application scenario type field is extended in the encapsulation file, and the first application scenario type field is used for indicating the application scenario corresponding to the media stream. Therefore, corresponding application scenarios of different media streams can be distinguished in the encapsulation of media files. On the one hand, when the encapsulation file is transmitted to a first device, the first device may distinguish the application scenario of the media stream according to the first application scenario type field in the encapsulation file, and consequently may determine which decoding method or rendering method to adopt for the media stream according to the application scenario corresponding to the media stream, which can save the computing power and resources of the first device. On the other hand, the application scenario of the media stream can be determined in the encapsulation stage, so even if the first device does not have the decoding capability for the media stream, the application scenario corresponding to the media stream can be determined without waiting until the media stream is decoded.

In an exemplary embodiment, the media stream encapsulating unit 1620 may include: a first application scenario type field addition unit, configured to add the first application scenario type field into a volumetric visual media header box of a target media file format data box; and a first application scenario type field value determining unit, configured to determine a value of the first application scenario type field according to the application scenario corresponding to the media stream.

In an exemplary embodiment, the value of the first application scenario type field may include any one of the following: a first value indicating that the media stream is a multi-view video with non-large-scale atlas information; a second value indicating that the media stream is a multi-view video with large-scale atlas information; a third value indicating that the media stream is point cloud media compressed based on conventional video encoding; and a fourth value indicating that the media stream is point cloud media compressed based on geometric features.

In an exemplary embodiment, when the value of the first application scenario type field is equal to the second value, the media file encapsulating apparatus 1600 may further include: a single-track large-scale atlas flag addition unit, configured to, when the media stream is encapsulated according to a single track, add a large-scale atlas flag into a bitstream sample entry of the target media file format data box; a single-track camera view identifier addition unit, configured to, when the large-scale atlas flag indicates that the media stream is a multi-view video with large-scale atlas information, add a quantity identifier of cameras for capturing the media stream and a quantity identifier of views corresponding to the cameras included in a current file of the media stream into the bitstream sample entry; and a single-track texture and depth map resolution addition unit, configured to add resolutions of texture maps and depth maps captured from the views corresponding to the cameras included in the current file into the bitstream sample entry.

In an exemplary embodiment, the media file encapsulating apparatus 1600 may further include at least one of the following: a single-track downsampling factor addition unit, configured to add downsampling factors of the depth maps captured from the views corresponding to the cameras included in the current file into the bitstream sample entry; a single-track texture map offset addition unit, configured to add offsets of upper-left vertexes of the texture maps captured from the views corresponding to the cameras included in the current file relative to origins of plane frames in the large-scale atlas information into the bitstream sample entry; a single-track depth map offset addition unit, configured to add offsets of upper-left vertexes of the depth maps captured from the views corresponding to the cameras included in the current file relative to the origins of the plane frames in the large-scale atlas information into the bitstream sample entry; and a single-track padding size addition unit, configured to add padding sizes of the texture maps and the depth maps captured from the views corresponding to the cameras included in the current file into the bitstream sample entry.

In an exemplary embodiment, when the value of the first application scenario type field is equal to the second value, the media file encapsulating apparatus 1600 may further include: a multi-track large-scale atlas flag addition unit, configured to, when the media stream is encapsulated according to a plurality of tracks, add a large-scale atlas flag into a sample entry of the target media file format data box; a multi-track camera view identifier addition unit, configured to, when the large-scale atlas flag indicates that the media stream is a multi-view video with large-scale atlas information, add a quantity identifier of cameras for capturing the media stream and a quantity identifier of views corresponding to the cameras included in a current file of the media stream into the sample entry; and a multi-track texture and depth map resolution addition unit, configured to add resolutions of texture maps and depth maps captured from the views corresponding to the cameras included in the current file into the sample entry.

In an exemplary embodiment, the media file encapsulating apparatus 1600 may further include at least one of the following: a multi-track downsampling factor addition unit, configured to add downsampling factors of the depth maps captured from the views corresponding to the cameras included in the current file into the sample entry; a multi-track texture map offset addition unit, configured to add offsets of upper-left vertexes of the texture maps captured from the views corresponding to the cameras included in the current file relative to origins of plane frames in the large-scale atlas information into the sample entry; a multi-track depth map offset addition unit, configured to add offsets of upper-left vertexes of the depth maps captured from the views corresponding to the cameras included in the current file relative to the origins of the plane frames in the large-scale atlas information into the sample entry; and a multi-track padding size addition unit, configured to add padding sizes of the texture maps and the depth maps captured from the views corresponding to the cameras included in the current file into the sample entry.

In an exemplary embodiment, the media file encapsulating apparatus 1600 may further include: a target description file generating unit, configured to generate a target description file of the target media content, the target description file including a second application scenario type field, the second application scenario type field being used for indicating the application scenario corresponding to the media stream; and a target description file transmitting unit, configured to transmit the target description file to the first device for the first device to determine a target encapsulation file corresponding to a target media stream from the encapsulation file of the media stream according to the second application scenario type field. The encapsulation file transmitting unit 1640 may include: a target encapsulation file transmitting unit, configured to transmit the target encapsulation file to the first device for the first device to determine a target application scenario corresponding to the target media stream according to a first application scenario type field in the target encapsulation file.

In an exemplary embodiment, the target description file generating unit may include: a second application scenario type field addition unit, configured to add the second application scenario type field into a dynamic adaptive streaming over hypertext transfer protocol (DASH) target description file of the target media content; and a second application scenario type field value determining unit, configured to determine a value of the second application scenario type field according to the application scenario corresponding to the media stream.

In an exemplary embodiment, the media stream acquiring unit 1620 may include: an encapsulation file receiving unit, configured to receive a first encapsulation file of a first multi-view video transmitted by a second device and a second encapsulation file of a second multi-view video transmitted by a third device; an encapsulation file decapsulating unit, configured to decapsulate the first encapsulation file and the second encapsulation file respectively to obtain the first multi-view video and the second multi-view video; a multi-view video decoding unit, configured to decode the first multi-view video and the second multi-view video respectively to obtain a first depth map and a first texture map in the first multi-view video, and a second depth map and a second texture map in the second multi-view video; and a multi-view video merging unit, configured to obtain a merged multi-view video according to the first depth map, the second depth map, the first texture map, and the second texture map.

In an exemplary embodiment, a first quantity of cameras may be installed on the second device, a second quantity of cameras are installed on the third device, and the second device and the third device may perform multi-view video capturing and shooting for a same scene by using the respective cameras to obtain the first multi-view video and the second multi-view video. The first encapsulation file and the second encapsulation file may include the first application scenario type fields respectively, and values of the first application scenario type fields in the first encapsulation file and the second encapsulation file may be respectively second values used for indicating that the first multi-view video and the second multi-view video are multi-view videos with large-scale atlas information.

In an exemplary embodiment, the media stream may include a six degrees of freedom (6DoF) media stream and a constrained 6DoF (3DoF+) media stream.

For the specific implementations of the units in the media file encapsulating apparatus provided in this embodiment of this application, reference may be made to the content in the foregoing media file encapsulating method, and details are not described herein again.

The media file decapsulating apparatus provided in the embodiments of this application may be configured on any electronic device. In the following exemplary descriptions, an example in which the media file decapsulating apparatus is configured on an intermediate node or a first device (such as a player side) of an immersive system is used, but this application is not limited thereto.

Figure 17:
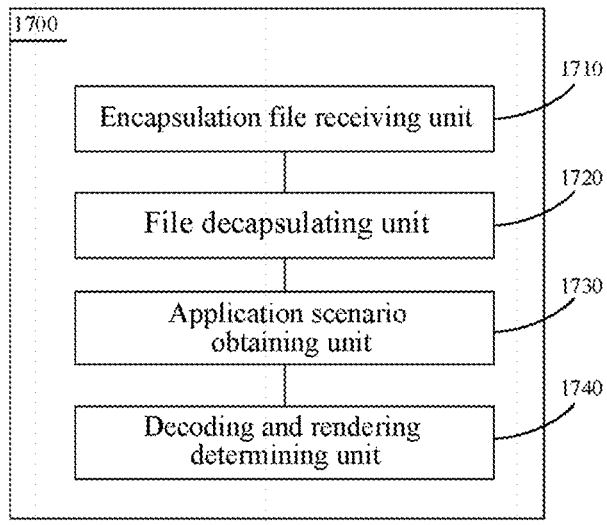
FIG. 17 is a schematic block diagram of a media file decapsulating apparatus according to an embodiment of this application.

FIG. 17 is a schematic block diagram of a media file decapsulating apparatus according to an embodiment of this application. As shown in FIG. 17, a media file decapsulating apparatus 1700 provided in this embodiment of this application may include an encapsulation file receiving unit 1710, a file decapsulating unit 720, an application scenario obtaining unit 1730, and a decoding and rendering determining unit 1740.

In this embodiment of this application, the encapsulation file receiving unit 1710 may be configured to receive an encapsulation file of a media stream of a target media content in a corresponding application scenario, the encapsulation file including a first application scenario type field, the first application scenario type field being used for indicating the application scenario corresponding to the media stream; the file decapsulating unit 1720 may be configured to decapsulate the encapsulation file to obtain the first application scenario type field; the application scenario obtaining unit 1730 may be configured to determine the application scenario corresponding to the media stream according to the first application scenario type field; and the decoding and rendering determining unit 1740 may be configured to determine at least one of a decoding method and a rendering method of the media stream according to the application scenario corresponding to the media stream.

In an exemplary embodiment, when a value of the first application scenario type field is a second value indicating that the media stream is a multi-view video with large-scale atlas information, the media file decapsulating apparatus 1700 may further include: an encapsulation file parsing unit, configured to parse the encapsulation file to obtain mapping relationships between plane frames in the large-scale atlas information and texture maps and depth maps captured from views corresponding to cameras included in the media stream; a media stream decoding unit, configured to decode the media stream to obtain camera parameters in the media stream; and a multi-view video presenting unit, configured to present the multi-view video in a 3-dimension (3D) space according to the mapping relationships and the camera parameters.

In an exemplary embodiment, the media file decapsulating apparatus 1700 may further include: a target description file receiving unit, configured to receive a target description file of the target media content, the target description file including a second application scenario type field, the second application scenario type field being used for indicating the application scenario corresponding to the media stream; and a target encapsulation file determining unit, configured to determine a target encapsulation file of a target media stream from the encapsulation file of the media stream according to the second application scenario type field. The encapsulation file receiving unit 1710 may include: a target application scenario determining unit, configured to receive the target encapsulation file to determine a target application scenario corresponding to the target media stream according to a first application scenario type field in the target encapsulation file.

For the specific implementations of the units in the media file decapsulating apparatus provided in this embodiment of this application, reference may be made to the content in the foregoing media file decapsulating method, and details are not described herein again.

Although a plurality of units of a device configured to perform actions are discussed in the foregoing detailed description, such division is not mandatory. In fact, according to the implementations of this application, features and functions of two or more units described above may be specified in one unit. On the contrary, the features or functions of one unit described above may further be divided and specified by a plurality of units.

An embodiment of this application provides a non-transitory computer-readable storage medium, storing a computer program, the program, when executed by a processor of an electronic device, causing the electronic device to implement the media file encapsulating method in the foregoing embodiments.

An embodiment of this application provides a non-transitory computer-readable storage medium, storing a computer program, the program, when executed by a processor of an electronic device, causing the electronic device to implement the media file decapsulating method in the foregoing embodiments.

An embodiment of this application provides an electronic device, including: at least one processor; and a storage apparatus, configured to store at least one program, the at least one program, when executed by the at least one processor, causing the at least one processor to implement the media file encapsulating method in the foregoing embodiments.

An embodiment of this application provides an electronic device, including: at least one processor; and a storage apparatus, configured to store at least one program, the at least one program, when executed by the at least one processor, causing the at least one processor to implement the media file decapsulating method in the foregoing embodiments.

Figure 18:
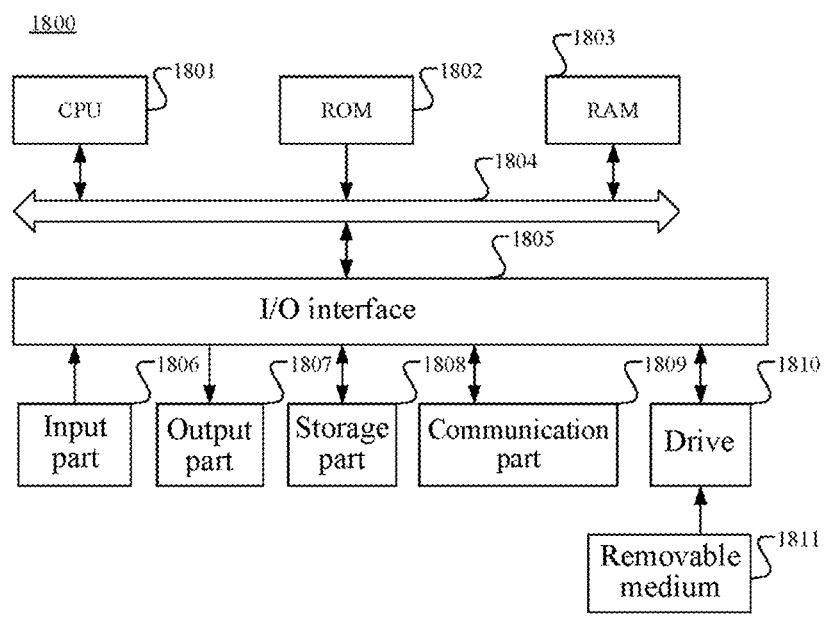
FIG. 18 is a schematic structural diagram of an electronic device adapted to implement the embodiments of this application.

FIG. 18 is a schematic structural diagram of an electronic device adapted to implement the embodiments of this application.

The electronic device 1800 shown in FIG. 18 is merely an example, and does not impose any limitation on the function and use scope of the embodiments of this application.

As shown in FIG. 18, the electronic device 1800 includes a central processing unit (CPU) 1801. The CPU can perform various proper actions and processing according to a program stored in a read-only memory (ROM) 1802 or a program loaded from a storage part 1808 into a random access memory (RAM) 1803. The RAM 1803 further stores various programs and data required for system operations. The CPU 1801, the ROM 1802, and the RAM 1803 are connected to each other through a bus 1804. An input/output (I/O) interface 1805 is also connected to the bus 1804.

The following components are connected to the I/O interface 1805: an input part 1806 including a keyboard, a mouse, and the like; an output part 1807 including a cathode ray tube (CRT), a liquid crystal display (LCD), a speaker, and the like; the storage part 1808 including hard disk and the like; and a communication part 1809 including network interface cards such as a local area network (LAN) card and a modem. The communication part 1809 performs communication processing by using a network such as the Internet. A drive 1810 is also connected to the I/O interface 1805 as required. A removable medium 1811, such as a magnetic disk, an optical disc, a magneto-optical disk, or a semiconductor memory, is installed on the drive 1810 as required, so that a computer program read from the removable medium is installed into the storage part 1808 as required.

Particularly, according to the embodiments of this application, the processes described in the following with reference to the flowcharts may be implemented as computer software programs. For example, an embodiment of this application includes a computer program product, including a computer program carried on a non-transitory computer-readable storage medium. The computer program includes program code for performing the method shown in the flowchart. In such an embodiment, the computer program may be downloaded and installed from a network through the communication part 1809, and/or installed from the removable medium 1811. When the computer program is executed by the CPU 1801, various functions defined in the method and/or apparatus of this application are executed.

The non-transitory computer-readable storage medium according to this application may be a computer-readable signal medium or a non-transitory computer-readable storage medium or any combination of the two media. The non-transitory computer-readable storage medium may be, for example, but is not limited to, an electric, magnetic, optical, electromagnetic, infrared, or semi-conductive system, apparatus, or device, or any combination thereof. More specific examples of the non-transitory computer-readable storage medium may include, but are not limited to: an electrical connection having at least one wire, a portable computer magnetic disk, a hard disk, a RAM, a ROM, an erasable programmable read only memory (EPROM) (or flash memory), an optical fiber, a compact disk read only memory (CD-ROM), an optical storage device, a magnetic storage device, or any proper combination thereof. In this application, the non-transitory computer-readable storage medium may be any tangible medium including or storing a program, and the program may be used by or in combination with an instruction execution system, apparatus, or device. In this application, the computer-readable signal medium may include a data signal being in a baseband or propagated as a part of a carrier wave, and carries computer-readable program code. The propagated data signal may be in a plurality of forms, including, but not limited to, an electromagnetic signal, an optical signal, or any proper combination thereof. The computer-readable signal medium may alternatively be any non-transitory computer-readable storage medium other than the non-transitory computer-readable storage medium. The non-transitory computer-readable storage medium may send, propagate, or transmit a program used by or in combination with an instruction execution system, apparatus, or device. The program code included in the non-transitory computer-readable storage medium may be transmitted using any proper medium, including but not limited to: a wireless medium, a wired medium, an optical cable, radio frequency (RF), or any proper combination thereof.

The flowcharts and block diagrams in the accompanying drawings show architectures, functions, and operations that may be implemented by using the method, the apparatus, and the computer program product according to the embodiments of this application. In this regard, each box in the flowchart or the block diagram may represent a module, a program segment, or a part of code. The module, the program segment, or the part of code includes at least one executable instruction used for implementing specified logic functions. In some implementations used as substitutes, functions marked in boxes may alternatively occur in a sequence different from that marked in an accompanying drawing. For example, two boxes shown in succession may actually be performed basically in parallel, and sometimes the two boxes may be performed in a reverse sequence. This is determined by a related function. Each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Related units described in the embodiments of this application may be implemented in a software manner, or may be implemented in a hardware manner, and the unit described can also be set in a processor. Names of these units do not constitute a limitation on the units in a case.

In another aspect, this application further provides a non-transitory computer-readable storage medium. The non-transitory computer-readable storage medium may be included in the electronic device described in the above embodiments, or may exist alone without being assembled into the electronic device. The non-transitory computer-readable storage medium carries one or more programs, the one or more programs, when executed by the electronic device, causing the electronic device to implement the method described in the following embodiments. For example, the electronic device may implement steps shown in FIG. 4, FIG. 5, FIG. 6, FIG. 10, FIG. 11, FIG. 12, or FIG. 15.

Through the description of the foregoing embodiments, a person skilled in the art can easily understand that the exemplary implementations described herein may be implemented by software, or may be implemented by combining software with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on a network, including several instructions for instructing a computing device (which may be a PC, a server, a touch terminal, a network device, or the like) to perform the methods according to the embodiments of this application.

Other embodiments of this application are apparent to a person skilled in the art from consideration of the specification and practice of this application here. This application is intended to cover any variations, uses or adaptive changes of this application. Such variations, uses or adaptive changes follow the general principles of this application, and include well-known knowledge and conventional technical means in the art that are not disclosed in this application. The specification and the embodiments are considered as merely exemplary, and the scope and spirit of this application are pointed out in the following claims.

It is to be understood that this application is not limited to the precise structures described above and shown in the accompanying drawings, and various modifications and changes can be made without departing from the scope of this application. The scope of this application is subject only to the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A media file encapsulating method performed by an electronic device, the method comprising:
acquiring a media stream of a target media content in a corresponding application scenario;
encapsulating the media stream to generate an encapsulation file of the media stream, the encapsulation file comprising a first application scenario type field, the first application scenario type field being used for indicating the application scenario corresponding to the media stream, wherein different values of the first application scenario type field indicate that the media streams corresponding to different application scenarios employ different video-decoding methods or different video-rendering methods, the encapsulating further including:
adding the first application scenario type field into a volumetric visual media header box of a target media file format data box; and
determining a value of the first application scenario type field according to the application scenario corresponding to the media stream; and
transmitting the encapsulation file to a first device, wherein the first device is configured to determine the application scenario corresponding to the media stream according to the first application scenario type field and determine at least one of a video-decoding method or a video-rendering method of the media stream according to the application scenario corresponding to the media stream,
wherein the value of the first application scenario type field comprises any one of the following:
a first value indicating that the media stream is a multi-view video with non-large-scale atlas information;
a second value indicating that the media stream is a multi-view video with large-scale atlas information;
a third value indicating that the media stream is point cloud media compressed based on conventional video encoding; and
a fourth value indicating that the media stream is point cloud media compressed based on geometric features.

2. The media file encapsulating method according to claim 1, wherein when the value of the first application scenario type field is equal to the second value, the method further comprises:
when the media stream is encapsulated according to one or more tracks, adding a large-scale atlas flag into a bitstream sample entry of the target media file format data box;
when the large-scale atlas flag indicates that the media stream is a multi-view video with large-scale atlas information, adding a quantity identifier of cameras for capturing the media stream and a quantity identifier of views corresponding to the cameras comprised in a current file of the media stream into the bitstream sample entry; and
adding resolutions of texture maps and depth maps captured from the views corresponding to the cameras comprised in the current file into the bitstream sample entry.

3. The media file encapsulating method according to claim 1, further comprising:
generating a target description file of the target media content, the target description file comprising a second application scenario type field, the second application scenario type field being used for indicating the application scenario corresponding to the media stream; and
transmitting the target description file to the first device for the first device to determine a target encapsulation file corresponding to a target media stream from the encapsulation file of the media stream according to the second application scenario type field, wherein
the transmitting the encapsulation file to a first device for the first device to determine the application scenario corresponding to the media stream according to the first application scenario type field comprises:
transmitting the target encapsulation file to the first device for the first device to determine a target application scenario corresponding to the target media stream according to a first application scenario type field in the target encapsulation file.

4. The media file encapsulating method according to claim 1, wherein the acquiring a media stream of a target media content in a corresponding application scenario comprises:
receiving a first encapsulation file of a first multi-view video transmitted by a second device and a second encapsulation file of a second multi-view video transmitted by a third device;
decapsulating the first encapsulation file and the second encapsulation file respectively to obtain the first multi-view video and the second multi-view video;
decoding the first multi-view video and the second multi-view video respectively to obtain a first depth map and a first texture map in the first multi-view video, and a second depth map and a second texture map in the second multi-view video; and
obtaining a merged multi-view video according to the first depth map, the second depth map, the first texture map, and the second texture map.

5. The media file encapsulating method according to claim 1, wherein the media stream comprises a six degrees of freedom (6DoF) media stream and a constrained 6DoF (3DoF+) media stream.

6. An electronic device, comprising:
at least one processor; and
a storage apparatus, configured to store at least one program, the at least one program, when executed by the at least one processor, causing the electronic device to implement a media file encapsulating method, the method including:
acquiring a media stream of a target media content in a corresponding application scenario;
encapsulating the media stream to generate an encapsulation file of the media stream, the encapsulation file comprising a first application scenario type field, the first application scenario type field being used for indicating the application scenario corresponding to the media stream, wherein different values of the first application scenario type field indicate that the media streams corresponding to different application scenarios employ different video-decoding methods or different video-rendering methods, the encapsulating further including:
adding the first application scenario type field into a volumetric visual media header box of a target media file format data box; and
determining a value of the first application scenario type field according to the application scenario corresponding to the media stream; and
transmitting the encapsulation file to a first device, wherein the first device is configured to determine the application scenario corresponding to the media stream according to the first application scenario type field and determine at least one of a video-decoding method or a video-rendering method of the media stream according to the application scenario corresponding to the media stream,
wherein the value of the first application scenario type field comprises any one of the following:
a first value indicating that the media stream is a multi-view video with non-large-scale atlas information;
a second value indicating that the media stream is a multi-view video with large-scale atlas information;
a third value indicating that the media stream is point cloud media compressed based on conventional video encoding; and
a fourth value indicating that the media stream is point cloud media compressed based on geometric features.

7. The electronic device according to claim 6, wherein when the value of the first application scenario type field is equal to the second value, the method further comprises:
when the media stream is encapsulated according to one or more tracks, adding a large-scale atlas flag into a bitstream sample entry of the target media file format data box;

when the large-scale atlas flag indicates that the media stream is a multi-view video with large-scale atlas information, adding a quantity identifier of cameras for capturing the media stream and a quantity identifier of views corresponding to the cameras comprised in a current file of the media stream into the bitstream sample entry; and adding resolutions of texture maps and depth maps captured from the views corresponding to the cameras comprised in the current file into the bitstream sample entry.

8. The electronic device according to claim 6, wherein the method further includes:

generating a target description file of the target media content, the target description file comprising a second application scenario type field, the second application scenario type field being used for indicating the application scenario corresponding to the media stream; and transmitting the target description file to the first device for the first device to determine a target encapsulation file corresponding to a target media stream from the encapsulation file of the media stream according to the second application scenario type field, wherein the transmitting the encapsulation file to a first device for the first device to determine the application scenario corresponding to the media stream according to the first application scenario type field comprises:

transmitting the target encapsulation file to the first device for the first device to determine a target application scenario corresponding to the target media stream according to a first application scenario type field in the target encapsulation file.

9. The electronic device according to claim 6, wherein the acquiring a media stream of a target media content in a corresponding application scenario comprises:

receiving a first encapsulation file of a first multi-view video transmitted by a second device and a second encapsulation file of a second multi-view video transmitted by a third device;

decapsulating the first encapsulation file and the second encapsulation file respectively to obtain the first multi-view video and the second multi-view video;

decoding the first multi-view video and the second multi-view video respectively to obtain a first depth map and a first texture map in the first multi-view video, and a second depth map and a second texture map in the second multi-view video; and obtaining a merged multi-view video according to the first depth map, the second depth map, the first texture map, and the second texture map.

10. The electronic device according to claim 6, wherein the media stream comprises a six degrees of freedom (6DoF) media stream and a constrained 6DoF (3DoF+) media stream.

11. A non-transitory computer-readable storage medium, storing a computer program, the computer program, when executed by a processor of an electronic device, causing the electronic device to implement a media file encapsulating method, the method including:

acquiring a media stream of a target media content in a corresponding application scenario;

encapsulating the media stream to generate an encapsulation file of the media stream, the encapsulation file comprising a first application scenario type field, the first application scenario type field being used for indicating the application scenario corresponding to the media stream, wherein different values of the first application scenario type field indicate that the media streams corresponding to different application scenarios employ different video-decoding methods or different video-rendering methods, the encapsulating further including:

adding the first application scenario type field into a volumetric visual media header box of a target media file format data box; and determining a value of the first application scenario type field according to the application scenario corresponding to the media stream; and transmitting the encapsulation file to a first device, wherein the first device is configured to determine the application scenario corresponding to the media stream according to the first application scenario type field and determine at least one of a video-decoding method or a video-rendering method of the media stream according to the application scenario corresponding to the media stream, wherein the value of the first application scenario type field comprises any one of the following:

a first value indicating that the media stream is a multi-view video with non-large-scale atlas information;

a second value indicating that the media stream is a multi-view video with large-scale atlas information;

a third value indicating that the media stream is point cloud media compressed based on conventional video encoding; and a fourth value indicating that the media stream is point cloud media compressed based on geometric features.

12. The non-transitory computer-readable storage medium according to claim 11, wherein the method further includes:

generating a target description file of the target media content, the target description file comprising a second application scenario type field, the second application scenario type field being used for indicating the application scenario corresponding to the media stream; and transmitting the target description file to the first device for the first device to determine a target encapsulation file corresponding to a target media stream from the encapsulation file of the media stream according to the second application scenario type field, wherein the transmitting the encapsulation file to a first device for the first device to determine the application scenario corresponding to the media stream according to the first application scenario type field comprises:

transmitting the target encapsulation file to the first device for the first device to determine a target application scenario corresponding to the target media stream according to a first application scenario type field in the target encapsulation file.

13. The non-transitory computer-readable storage medium according to claim 11, wherein the acquiring a media stream of a target media content in a corresponding application scenario comprises:

receiving a first encapsulation file of a first multi-view video transmitted by a second device and a second encapsulation file of a second multi-view video transmitted by a third device;

decapsulating the first encapsulation file and the second encapsulation file respectively to obtain the first multi-view video and the second multi-view video;

decoding the first multi-view video and the second multi-view video respectively to obtain a first depth map and a first texture map in the first multi-view video, and a second depth map and a second texture map in the second multi-view video; and obtaining a merged multi-view video according to the first depth map, the second depth map, the first texture map, and the second texture map.

14. The non-transitory computer-readable storage medium according to claim 11, wherein the media stream comprises a six degrees of freedom (6DoF) media stream and a constrained 6DoF (3DoF+) media stream.

* * * * *